FIG.15
FIG.16
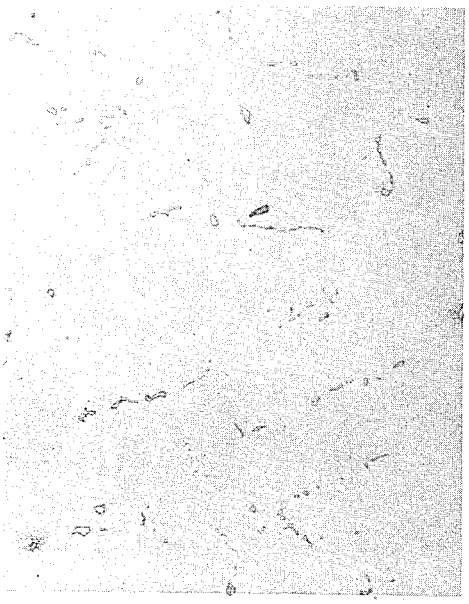
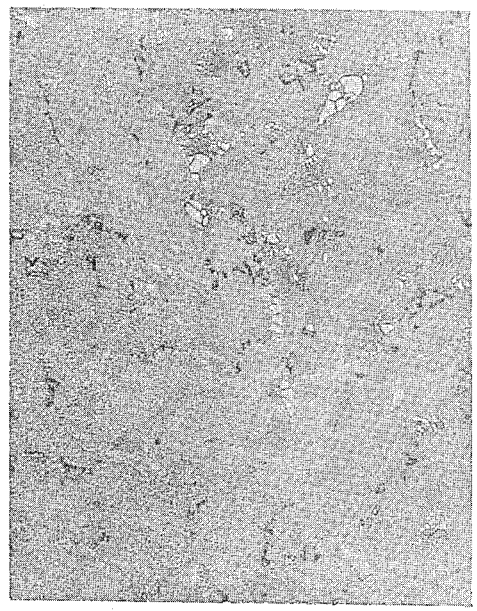
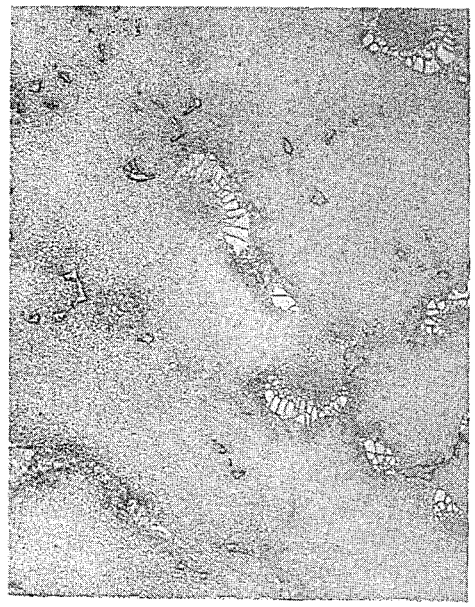
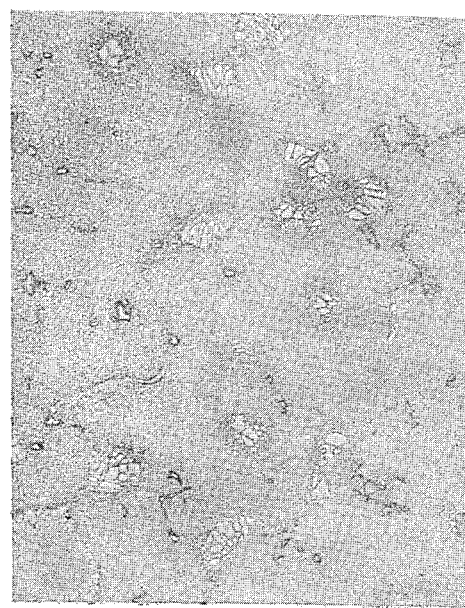
FIG.17
FIG.18

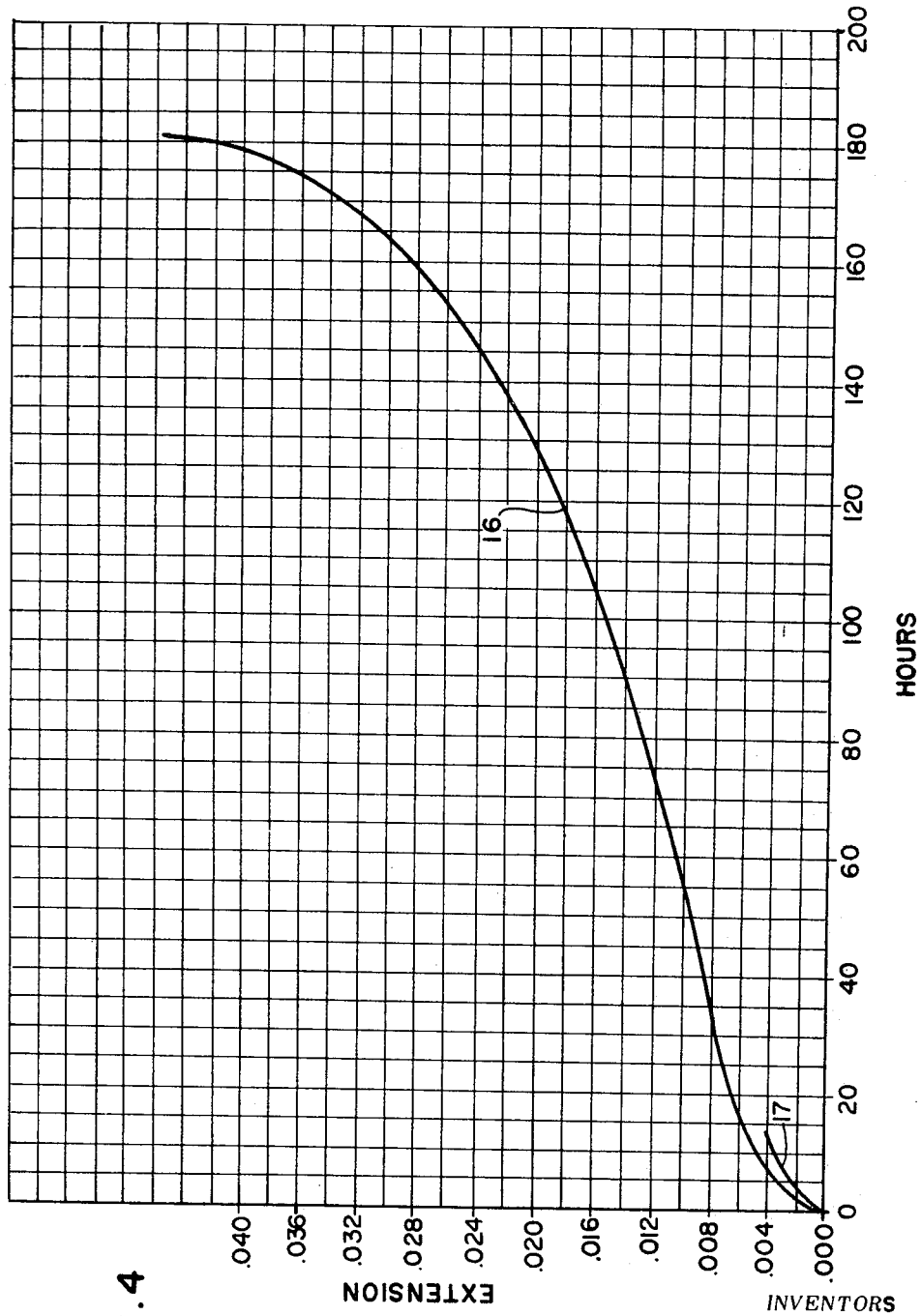

United States Patent Office 3,677,747
Patented July 18, 1972

3,677,747
HIGH TEMPERATURE CASTABLE ALLOYS AND CASTINGS
Carl H. Lund and John Hockin, Arlington Heights, and Michael J. Woulds, Schaumburg, Ill., assignors to Martin Marietta Corporation, New York, N.Y.
Continuation-in-part of applications Ser. No. 725,074, Apr. 29, 1968, Ser. No. 841,408, Ser. No. 841,504, and Ser. No. 841,505, all July 14, 1969. This application June 28, 1971, Ser. No. 157,335
Int. Cl. C22c *19/00*
U.S. Cl. 75—171   49 Claims

ABSTRACT OF THE DISCLOSURE

Nickel-base alloys useful in the form of castings as gas turbine engine hardware and processes with respect to such nickel-base alloys wherein special amounts of hafnium are employed to enhance ductility of virgin alloy, to overcome ductility deficiencies in alloys containing revert and to constitute an integral part of the process of making cast objects such as gas turbine blades which are subjected in use to the combined effects of high stress at high temperatures.

---

The present invention is a continuation-in-part of applications Ser. Nos. 725,074, filed Apr. 29, 1968 (now abandoned); 841,408, filed July 14, 1969; 841,504, filed July 14, 1969 (now abandoned); and 841,505, filed July 14, 1969 (now abandoned).

The present invention is concerned with castable alloys and, more particularly, investment-cast nickel base alloys particularly adapted to be employed as hot-stage gas turbine hardware and processes relating to said castable alloys.

BACKGROUND OF THE INVENTION

Quite a number of nickel-base alloys having adequate strength for use at temperatures in the range of 1700° F. to 1950° F. are known. These alloys have been suggested for and have been adapted for use in hot stages of gas turbines. Over the years, alloy development in this field has centered upon nickel-base alloys containing chromium, cobalt, molybdenum, tungsten, columbium, tantalum, aluminum, titanium, carbon, zirconium, and boron. In general, the morphology of such alloys comprises a matrix having certain phases dispersed within the mass of each crystal and at the crystal boundaries. In the more recently developed nickel-base alloys for extreme high temperature use, the basic phase in the crystalline matrix is a gamma-prime phase believed to consist essentially of $Ni_3Al$ wherein nickel can be replaced in part by cobalt, chromium, iron, etc. and aluminum can be replaced in part by titanium, columbium, and other elements. Chief among the intra-granular and grain boundary phases are various forms of carbide phases generally represented by the formulas $MC$, $M_{23}C_6$ and $M_6C$. As a general rule, when the carbide phases form relatively small particles and are generally distributed throughout the matrix of the alloy crystals, carbide phases assist in strengthening the alloy without greatly contributing to loss of ductility. Again, as a general rule, if the carbide phases are preferentially segregated in the grain boundary areas as a continuous network or cellular precipitate then the carbides tend to considerably enhance detrimental characteristics, such as loss of ductility. This characteristic is not limited to carbide phases. In general, it can be said that at high temperatures the grain boundaries are the weak portions of any particular alloy and any phases which preferentially segregate in grain boundary areas usually contribute to loss of ductility.

It is generally the fact that as alloys are made stronger (usually by increase of alloying content), the ductility of the alloy decreases. Metallurgists have learned to live with compromises between strength and ductility. The alloys mentioned and specifically disclosed hereinafter represent commercially acceptable compromises between strength and ductility. The compromises represented by alloys specifically disclosed hereinafter are not simple compromises in the sense that, for a given strength level at any given temperature, one must live with some relative uniformly variable amount of ductility. It has been known for a long time that most nickel-base alloys having strength characteristics of sufficiently large magnitude to enable the alloys to be usefully employed at temperatures of 1700° F. and higher exhibit, what is commonly termed, a ductility trough at some lower temperature usually around 1400° F. If one plots the tensile elongation against temperature, the usual plot will show little change from room temperature up to approximately 1300° F. Between 1300° F. and roughly 1550° F., the curve representing ductility will show a minimum and usually this minimum will have a value less than the percentage elongation measured at room temperature. One of the compromises which metallurgists have been forced to make heretofore is to design an alloy which will give a commercially acceptable elongation even at the nadir of the ductility trough.

Relatively recently a rather unexpected phenomenon has been encountered with a particular high temperature alloy specifically with respect to the ductility at 1400° F. As is conventional, this particular alloy was selected and designed on the basis of experimental results obtained using normal cast-to-size tensile and creep specimens. When tested by the normal, commercially acceptable test procedures, these cast-to-size speciments give all indications of commercially acceptable ductility in the 1400° F. range. However, when turbine engine hardware, such as turbine blades, were made from this alloy by normal commercially accepted practice of investment casting, the hardware often appeared to exhibit less than desirable ductility at about 1400° F. This phenomenon is especially noticeable in hardware made from revert heats, i.e. heats containing more than about 5% of previously melted and cast alloy. Further investigation based upon testing of test specimens cut from hardware indicated that there is a mass effect which detrimentally affects ductility in the critical region, about 1400° F. Thus it was found that specimens cut from actual cast hardware often gave much lower values of percent elongation and percent reduction in area in tensile and creep tests at 1400° F. than those values given by testing cast-to-size tensile and creep specimens from the same alloy. From a practical point of view, the object of a metallurgist is to produce hardware which has good engineering characteristics. The fact that characteristics measured on normal cast-to-size specimens are not representative of properties of characteristics of actual hardware is a vexing and difficult problem which compounds the problem presented by the existence of the well-known ductility trough at about 1400° F.

Another problem which is of critical concern to designers of gas turbine engines, particularly aircraft gas turbine engines, is the problem of uniformity or lack thereof in cast alloys resulting in a relatively wide scatter-band of values of characteristics determined on what are considered to be identical samples. When an alloy is developed, it is quite usual to associate with the alloy certain typical values for characteristics such as tensile strength, elongation, creep rupture data and the like. It is well known, however, that such typical values are relatively meaningless to a hardware designer. The designer of a turbine blade must know not only the typical value of engineering characteristics of interest to him but also the statistical data which will show how much variation he can expect, from blade to blade, from such typical values. The designer also needs to know how much, if any, variation there is in the values of characteristics based on cast-to-size test specimens as well as test specimens machined from cast turbine blades. Normally the designer is concerned with minimum expected values since the factor of safety must always be uppermost in his mind. On the other hand, a designer interested in ultimately producing an aircraft which will fly and which will fly efficiently must concern himself with weight. He cannot allow excess weight to accumulate as a result of the use of ultra-conservative safety factors and still expect to ultimately produce an efficient aircraft. Accordingly, it is advantageous to provide castable alloys which consistently exhibit a predictable, high minimum limit or the values of percent prior creep at 1400° F. based on test samples cut from hardware.

Two other major problems which exist in state-of-the-art nickel-base, cast, high temperature alloys are their sensitivity to low cycle fatigue and the detrimental effect that extended exposure to relatively high temperature has upon their impact resistance. An aircraft gas turbine engine is normally exposed to extremes of temperature occurring in a repetitive but not necessarily cyclic fashion. When the aircraft is at rest on the ground, the entire turbine, including the blades, is at normal ambient temperature, e.g. usually somewhere about 100° F. When the engines are fired up, the average blade temperature immediately rises to temperatures in excess of 1500° F. or 1600° F. During take-off under maximum power the blade temperatures rise even higher. During flight this average high temperature may decrease or, as projected in the near future, may remain relatively constant. On landing the use of thrust reversal mechanisms causes a cycle similar to take-off. When the engines are turned off, the hot stages of the turbine are subjected to a drastic air quench because inertia keeps the compressor stage feeding relatively cool air into the turbine for an appreciable amount of time after fuel cut-off. To complicate matters, a turbine blade is not at a uniform temperature at any time during operation. One section of a blade can be and often is hotter than another section by a differential of perhaps hundreds of degrees in Fahrenheit units. All these factors and others cause thermal or low cycle fatigue in turbine blades and other components resulting in warping, thermal fatigue cracking and, in extreme cases, catastrophic failure. Thus the behavior of turbine blade materials under thermally fatiguing conditions is a major factor to be considered in selecting a material commercially applicable under any specifically defined conditions. Accordingly, improvements in other mechanical characteristics of high strength hot-stage turbine hardware alloys cannot be made at the expense of resistance to thermal fatigue.

To be effectively operative in practical gas turbines, turbine blade materials must exhibit a reasonable amount of impact resistance. Initially, most materials proposed and used for hot stage parts in gas turbines have impact resistance adequate to insure against blades breaking when and if they are subject to impact at high temperatures. Such impact can occur, for example, by foreign objects being drawn into the inlet airstream of a turbine engine during operation. As time-at-temperature or, as practically measured, hours-of-service increases, the general tendency with respect to state-of-the-art cast turbine blade materials is for the impact resistance to decrease. It is not unusual for the numerical values of room temperature impact resistance of a turbine blade alloy to be lowered by up to 50% merely by holding the alloy for fifty hours at 2000° F. Some turbine engine manufacturers consider such a result to be highly significant. Thus development of turbine blade alloys which initially exhibit, and retain under high temperature exposure, high values of impact resistance at room temperature is a highly desired metallurgical objective.

It has now been discovered that by slightly varying the chemistry of alloys exhibiting hitherto a commercially acceptable combination of strength and ductility characteristics, it is possible to provide alloys having a distinctly different microstructural morphology and having enhanced ductility. At the same time, the alloys retain substantially the same or an enhanced combination of strength and other engineering characteristics which contribute to their utility in the high temperature gas turbine engine hardware field. It has also been discovered that by the same slight variation of the chemistry, turbine blades can be made which exhibit substantially greater statistical uniformity of characteristics, substantially greater resistance to thermal fatigue and substantially greater resistance to the detrimental effects of time at high temperature upon room temperature impact resistance. Alternatively, in perhaps a broader aspect, the present invention involves the discovery of a casting process wherein a novel feature is causing alloy incorporating the aforesaid slight variation in chemistry, to be cast into substantially final shape in a precision, refractory, investment mold to thereby provide in the cast object values of characteristics which more closely approach the ultimate values of characteristics obtainable in said alloy than have been achieved heretofore.

It is an object of the present invention to provide novel high temperature jet engines hardware made with revert.

It is another object of the present invention to provide a process for producing novel high temperature jet engine hardware made with revert.

It is still a further object of the invention to provide novel castable alloys having enhanced ductility characteristics.

A still further object of the present invention is to provide a process for producing cast, gas turbine engine hardware having normal statistical distribution of values of engineering characteristics from revert-containing heats.

An additional object of the present invention is to provide a process for producing from revert-containing heats cast, gas turbine engine hardware having highly enhanced resistance to low cycle fatigue.

Another object of the present invention is to provide a process for producing cast, gas turbine engine hardware having highly enhanced resistance to the detrimental effects of time at high temperature upon impact resistance.

A still further object of the present invention is to provide highly advantageous turbine engine hardware.

Other objects and advantages will become apparent from the following description taken in conjunction with the drawing in which:

FIG. 4 is a graph illustrating the creep characteristics of alloy hardware within the ambit of the present invention and alloy hardware outside the ambit of the present invention when both alloys tested are made from revert heats and the test specimens are machined from investment-cast turbine blades;

FIGS. 7 to 18 comprise a series of reproductions of photomicrographs from various loci in sections of turbine blade castings.

GENERAL ASPECTS OF THE INVENTION

Figure 1:
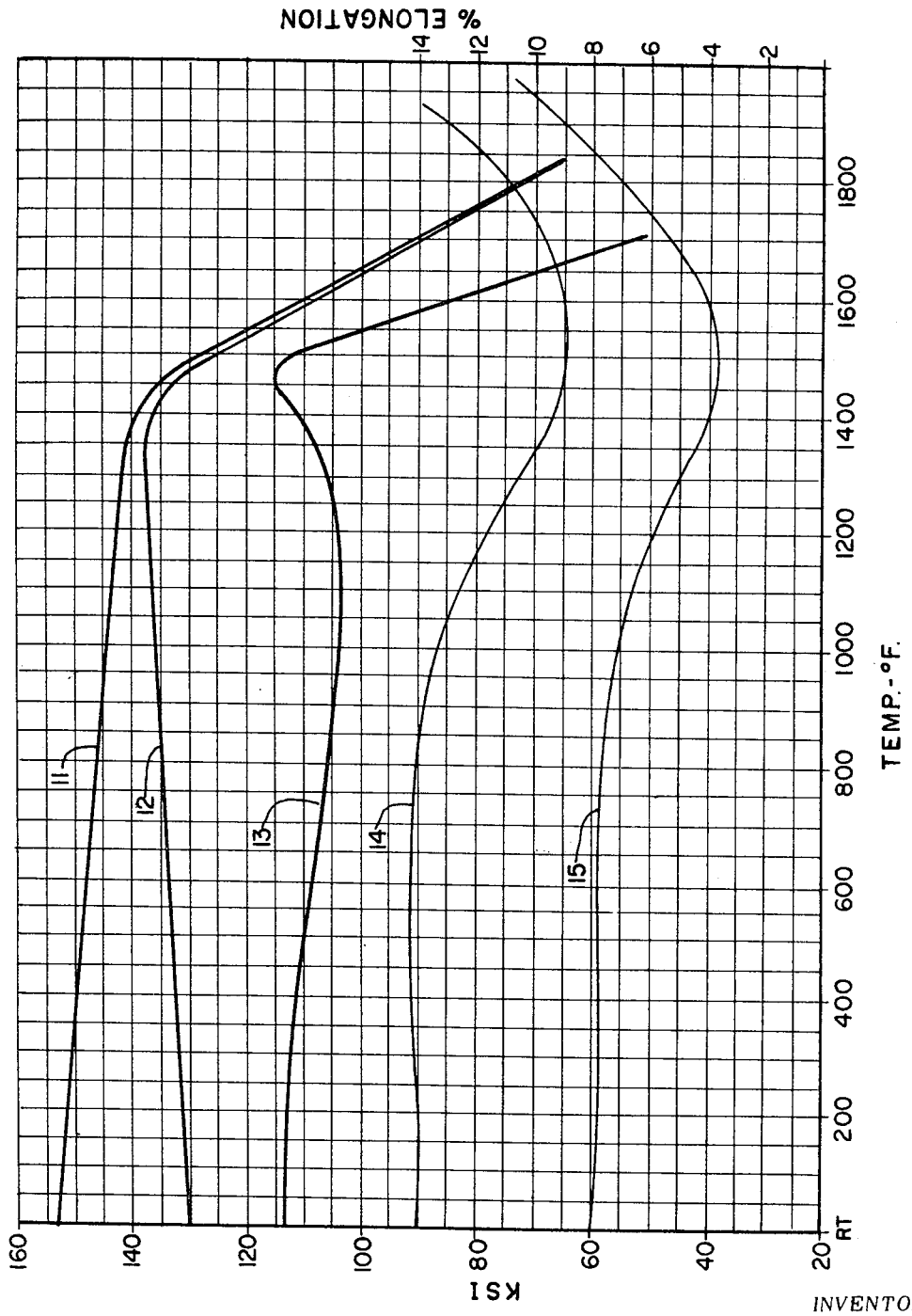
FIG. 1 is a graphical plot of tensile strength, yield strength and percent elongation against temperature of two alloys, one within the ambit of the present invention and the other outside the ambit of the present invention.

Generally speaking, the present invention is concerned with nickel-base, gamma-prime-phase-containing alloys specifically adapted to be employed in the cast condition under high stress at high temperature in uses such as parts in gas turbine engines. The invention also concerns processes for producing such alloys, enhancing the characteristics of such alloys and producing parts made from such alloys. The alloys with which the present invention is concerned generally contain in percent by weight about 7% to about 13% chromium, up to about 35% cobalt, up to about 0.5% carbon, up to about 5.5% tantalum, at least 6% and up to about 12% total aluminum plus any titanium, and usually above 6% and preferably above 6.5% aluminum titaninum, with the balance of the alloy being essentially nickel together with amounts of elements such as tungsten, molybdenum, columbium, vanadium, boron and zirconium ordinarily included by those skilled in the art of formulating alloys for intended uses as cast objects or which are included inadvertently in the alloys by virtue of impurity levels in commercial grades of alloying ingredients. It is the principal aspect of the present invention to include in the aforedescribed alloys amounts of hafnium generally within the range of 0.7% to 5% by weight (said general range being somewhat modifiable in accordance with the teachings of this specification) to enhance the strength and ductility of said alloys at room temperature and at temperatures around 1400° F. without substantially deleteriously affecting other important engineering characteristics of said alloys. Table I sets forth broad and narrower ranges of percent by weight of elements employed in alloys with which the invention is concerned, it being understood that the tabulation relates to each element individually and is not intended to solely define composits of broad and narrower ranges.

TABLE I

| Element | Broad range | Narrower ranges | |
|---|---|---|---|
| Cr | 7-18 | 7-13 | 7-11 |
| Co | 0-35 | 0-20 | 0-18.5 |
| C | 0.02-0.5 | 0.02-0.35 | 0.02-0.2 |
| W | 0-14 | 0-12 | 0-6 |
| Mo | 0-8 | 0-6 | 0-2 |
| Ta | 0-5.5 | <5 | 0-4.4 |
| Ti | 0-6 | 0.5-6 | 1-5 |
| Al | 4-7 | 4.3-6.5 | 4.5-7 |
| Al plus Ti | >6 | 6-12 | 6.5-10.5 |
| B | 0.002-0.2 | 0.002-0.1 | 0.002-0.02 |
| Zr | 0-0.3 | (¹) | 0.002-0.15 |
| Cb | 0-3 | 0-2.5 | 0-2 |
| V | 0-1.5 | 0-1 | |
| Ni | Balance | >36% | |

¹ Up to 0.2.

Alloys made up from elements in the ranges set forth in Table I are advantageously balanced so as to conform to the equation $$1 \times \% \text{ Cr} + 1.1 \times \% \text{ (W+Mo)} + 3.4 \times \% \text{ (Cb+Ta)} + 4.3 \times \% \text{ Ti} + 6 \times \% \text{ Al} = 60\text{-}72$$

when the weight percents of chromium, tungsten, columbium, tantalum, aluminum and titanium are substituted therein. For convenience, the numerical value given by this equation is referred to hereinafter and in the claims as the "hardenability factor."

In a general sense, the present invention has three aspects (A) the inclusion of hafnium in alloy melts containing previously remelted and cast metal (revert) to obviate deleterious effects of revert (B) inclusion of hafnium in virgin alloys (i.e. those containing no revert) and (C) casting hafnium-containing alloys into particularized shapes in a particular manner so as to produce castings having highly advantageous characteristics. The following particularized description is divided thusly.

VIRGIN AND REVERT-CONTAINING ALLOYS

Generally speaking, the revert aspect of the present invention contemplates high temperature, investment cast turbine engine hardware, such as turbine blades, vanes, integrally cast turbine wheels and nozzle guide vanes made from a chromium-containing nickel-base or nickel-cobalt base alloy having, on the average and in its original form, commercially acceptable strength and ductility characteristics, which alloy is modified by the inclusion, along with at least 5% of previously remelted and cast alloy, of about 0.7% to about 5% (by weight) of hafnium in the alloy composition. While inclusion of at least 0.7% hafnium along with revert in cast nickel-base alloy is deemed to achieve optimum results, hafnium in excess of 0.3% is beneficial in overcoming the detrimental effects of revert. As employed in the present invention, hafnium can be included in the alloy as a substitute for an equal percent by weight of one or more of nickel, tantalum and, at times, other elements. Advantageously, hafnium in amounts of about 0.7% to about 1.6% is substituted for equal percents by weight of tantalum when tantalum is present (in amounts up to about 5% by weight) in the basic alloy being improved in accordance with the present invention. Generally speaking, when hafnium is substituted for elements such as tantalum in an alloy, it is likely that the strength characteristics of the basic alloy will not be significantly changed while, at the same time, the ductility of the alloy will be significantly enhanced. When hafnium is substituted for alloying elements such as nickel, the ductility characteristics of the alloy will be significantly improved while, at the same time, it is possible that the strength characteristics of the base alloy will be improved. It is to be observed, however, that the inclusion of hafnium in a nickel-base alloy already extremely loaded with hardening elements and designed specifically for the highest strength levels at the highest temperatures without due regard for ductility will not necessarily raise the ductility to levels of generally acceptable commercial standards at trough temperatures. In other words, the present invention is not a substitute for the exercise of reasonable metallurgical judgment in the balancing of alloy compositions to obtain a commercially viable compromise between strength and ductility. It is often highly advantageous to substitute hafnium for all or part of any molybdenum present in an alloy. When hafnium is employed in place of molybdenum, it is likely that the modified alloy will exhibit greater stability with respect to the formation of undesirable phases during long term exposure to uniform and cyclically applied elevated temperatures such as are encountered in hot stage, turbine engine hardware service. Generally speaking, from the revert aspect alloys to which the present invention are applicable contain in weight percent about 7% to about 18% chromium, up to about 0.5% carbon, up to about 35% cobalt, at least about 6% and up to about 12% aluminum plus titanium, up to about 5% tantalum, with the balance being essentially nickel together with amounts of elements such as tungsten, molybdenum, columbium, vanadium, boron and zirconium ordinarily included by those skilled in the art of formulating alloys suitable for use as cast, hot-stage gas turbine components or which are included by inadvertence in the alloys by virtue of impurity levels in commercial grades of alloying ingredients. It is particularly advantageous to apply the present invention to those of such alloy compositions which also exhibit values of at least 60, preferably in excess of 60, e.g. 60 to 72, of the hardenability factor as defined hereinbefore. When this so defined hardenability factor exceeds about 60, it is generally the fact that cast test specimens of the alloy will exhibit a lift-to-rupture of at least about 1000 hours when tested under a load of 20 k.s.i. at 1650° F. Most of the alloys with which the present invention is concerned will exhibit 1000 hours life under a load of 20 (k.s.i. at temperatures in excess of 1700° F. The temperature at which an alloy exhibits a life-to-rupture of 1000 hours under a load of 20 k.s.i. is sometimes called the "temperature capability" for that alloy.

The chemistry in weight percent of some known nickel-base alloys to which the present invention is applicable are set forth in Table II.

TABLE II

|    | A | B | C | D | E | F |
|----|------|------|------|------|------|------|
| C  | 0.15 | 0.10 | 0.15 | 0.12 | 0.18 | 0.05 |
| Cr | 9.0  | 8.0  | 9.0  | 12.5 | 10.0 | 12.0 |
| Co | 10.0 | 10.0 | 10.0 |      | 15.0 |      |
| W  | 10.0 |      |      | 12.5 |      |      |
| Mo | 2.5  | 6.0  |      | 4.2  | 3.0  | 4.5  |
| Ta | 1.5  | 4.25 |      |      |      |      |
| Ti | 1.5  | 1.0  | 2.0  | 0.8  | 4.7  | 0.6  |
| Al | 5.5  | 6.0  | 5.0  | 6.1  | 5.5  | 5.9  |
| B  | 0.015| 0.015| 0.015| 0.012| 0.014| 0.010|
| Zr | 0.05 | 0.10 | 0.50 | 0.10 | 0.06 | 0.10 |
| Cb |      |      | 1.0  | 2.0  |      | 2.0  |
| V  |      |      |      |      | 1.0  |      |
| Ni | (¹)  | (¹)  | (¹)  | (¹)  | (¹)  | (¹)  |

¹ Balance.

It is to be observed that compositions set forth in Table II are nominal compositions and the percentage of each element present may be varied plus or minus about 10% of the amount specified. The alloys can also contain up to about 2% (by weight) total of incidental elements such as manganese, silicon, iron, etc. Non-metallics such as sulfur, oxygen and nitrogen and deleterious metallics such as lead, bismuth, arsenic, etc. are kept at as low a level possible consistent with good commercial practice. Advantageously, all of the alloys in Table II and the alloys of the present invention are prepared by vacuum melting and casting, while under vacuum, into investment-casting molds having gas turbine engine hardware form.

From Table II one skilled in the art will observe that alloys advantageously treated in accordance with the present invention by the inclusion of hafnium therein to provide advantageous, hot stage, gas turbine engine hardware fall within the range of composition, in weight percent, as set forth in Table III.

TABLE III

|   | Percent |
|---|---------|
| C | 0.02–0.5 |
| Cr | 7–13 |
| Co | Up to 35 |
| W | Up to 14 |
| Mo | Up to 8 |
| Ta | Up to 5.5 |
| Ti | 0.5–6 |
| Al | 4–7 |
| Al+Ti | 6.5–10.5 |
| B | 0.002–0.2 |
| Zr | Up to 0.3 |
| Cb | Up to 3 |
| V | Up to 1.5 |

Ni—Balance (not less than about 36%) essentially.

Adding hafnium, or, advantageously, substitution of hafnium in amounts of about 0.7% (or, at times, amounts as low as 0.3%) to about 1.5% or even 5% by weight in balanced alloy compositions within the range set forth in Table III enhances ductility of revert-containing alloy particularly in the trough region about 1400° F. without detrimentally affecting other important engineering characteristics of the alloys. Except in those cases where hafnium is already present in sufficient amounts in revert, in which instances no additional hafnium is necessary, the hafnium addition is made to the alloy after deoxidation and, thereafter, the modified alloy is treated exactly as it would be if no modification had been made. Alloys within the range set forth in Table III can be balanced especially with regard to the elements tantalum and tungsten (when tungsten is present) by maintaining the tungsten content in excess of about 8% by weight and maintaining the total of tantalum plus tungsten below about 13% or even 10% by weight. Castable alloys and alloy castings made in accordance with this invention are adapted for use under stress at temperatures up to about 1800° F. to 1900° F. and exhibit in the cast solidified state improved ductility at temperatures of about room temperature to about 1600° F. when compared to similarly constituted alloys devoid of hafnium.

Generally speaking, the present invention contemplates novel alloys suitable for manufacture of investment-cast gas turbine hardware such as turbine blades, turbine vanes, and integrally cast turbine wheels, which alloys consist in percent by weight essentially of about 0.02% to about 0.5% carbon, about 7% to about 13% chromium, up to about 35% cobalt, up to about 14% tungsten, up to about 8% molybdenum, up to about 5.5% tantalum, up to about 3% columbium, about 4% to about 7% aluminum, about 0.5% to about 6% titanium with the total of said aluminum and said titanium being about 6.5% to about 10.5% about 0.7% up to about 5% hafnium, up to about 1.5% vanadium, about 0.002% to about 0.3% boron, up to about 0.3% zirconium, with the balance being essentially nickel in an amount at least 36% and usually greater than about 36%. Advantageously, in alloys of the invention the cobalt content does not exceed about 20%, the total of the percentages of tantalum plus chromium does not exceed 16% and the hafnium content is advantageously at least about 1% by weight and in excess of 1% by weight. At times, however, amounts of hafnium as low as 0.5% can be effective for purposes of the invention. It is sometimes advantageous for hafnium to be at least equivalent on an atom-for-atom basis with copresent carbon.

The novel alloys of the present invention are made by the usual techniques of melting virgin materials under high vacuum and casting the resultant molten alloy while still under vacuum into ingot form. The virgin ingots are then remelted under high vacuum and cast again, while still under high vacuum, into precision investment molds of the shape of the desired articles. Of course, as is usual in the manufacture of high temperature alloys, care must be taken to avoid including in the alloy amounts of impurities and incidental elements such as manganese, silicon, sulfur, iron, copper and the like which can be detrimental. Thus manganese, silicon, iron and copper can be tolerated only to the extent of about 0.3% of each element. Sulfur should be kept at as low a level as practical, e.g. less than about 0.004% and other detrimental elements should also be controlled so as not to exceed very low levels in the alloys. It is also advantageous to balance the alloys of the present invention so as to conform to a value of about 60 to 72 of the Hardenability Factor as defined hereinbefore. Normally, alloys of the kind in question have heretofore been formulated as hafnium-free alloys containing a maximum of about 0.15% zirconium. While it is advantageous to introduce hafnium as zirconium-free material and thus maintain the maximum of 0.15% zirconium in hafnium-containing alloys, commercial grades of hafnium usually contain small percentages of zirconium. Thus the hafnium-containing alloys of the present invention can contain up to 0.2% or 0.3% zirconium, e.g. about 0.001% to 0.25% zirconium.

The advantages of both the revert and the virgin alloy aspects of the present invention are demonstrated with reference to the following discussion, particularly with regard to the alloy ranges set forth in Table IV.

TABLE IV

|  | Alloy range 1, percent | Alloy range 2, percent |
|---|---|---|
| C | 0.10–0.18 | 0.03–0.13 |
| Cr | 7–11 | 7–10 |
| Co | 6–13 | 6–13 |
| W | 8–12 | (¹) |
| Mo | 2–3 | 4–8 |
| Ta | (²) | 2.5–4.5 |
| Ti | 1–2 | 0.5–1.5 |
| Al | 5–6 | 5.5–6.5 |
| B | 0.004–0.02 | 0.004–0.02 |
| Zr | 0.02–0.2 | 0.02–0.20 |
| Hf | 0.3–5 | 0.3–5 |
| Ni | (³) | (³) |

¹ Up to 2%.
² Up to 3%.
³ Balance essentially.

Alloys within ranges 1 and 2 set forth in Table IV were melted and cast under vacuum to provide cast-to-size test bars, cast-to-size hardware and incidental specimens for chemical analysis. Comparative specimens were prepared from alloys A and B which, except for hafnium, are essentially similar to alloys of ranges 1 and 2, respectively. In the following tables, Examples 1–1, 1–2, etc. represent various samples of alloy range 1 and Examples 2–1, 2–2, etc. represent various samples of alloy range 2.

The data in Table V shows the characteristics of alloy 2 as opposed to alloy B when cast-to-size test specimens are tested in standard tensile tests at room temperature. In order to approximate commercial practice, all of the tests set forth in Tables IV to VIII were conducted on vacuum melted and cast specimens subjected to a heat treatment at 1975° F. for four hours followed by holding at 1650° F. for 10 hours.

TABLE V

|  | Percent Hf (nominal) | Room temperature, U.T.S. (k.s.i.) | Room temperature, Y.S. (k.s.i.) | Elongation, percent |
|---|---|---|---|---|
| Alloy B | 0 | 133.7 | 109.6 | 8.0 |
| Example No.: |  |  |  |  |
| 2–1 | 0.5 | 129.7 | 108.0 | 8.5 |
| 2–2 | 1 | 132.3 | 112.9 | 6.0 |
| 2–3 | 1.5 | 156.1 | 113.2 | 14.0 |

NOTE.—U.T.S. (k.s.i.) = Ultimate tensile strength in thousands of pounds per square inch; Y.S. (k.s.i.) = Yield strength (0.2% offset) in thousands of pounds per square inch.

Table VI shows the creep characteristics of alloy B and alloy 2 exhibited when standard cast-to-size specimens are tested at 1400° F. under a load of 94 k.s.i.

TABLE VI

|  | Percent Hf (nominal) | Life-to-rupture (hours) | Prior creep ¹ (percent) |
|---|---|---|---|
| Alloy B | 0 | 48 | 1.9 |
| Example No.: |  |  |  |
| 2–1 | 0.5 | 58.3 | 2.9 |
| 2–2 | 1 | 86.0 | 4.27 |
| 2–3 | 1.5 | 130.6 | 6.39 |

¹ Prior creep indicates the creep measured by dial extensometers within two hours pior to failure.

The data in Tables V and VI show that the mechanical characteristics of alloy B and alloy 2 are at least equivalent except that at 1400° F. the hafnium-containing alloys exhibit much greater ductility under creep inducing conditions and substantially enhanced lives-to-rupture.

FIG. 1 shows in graphical form, tensile characteristics of virgin alloy B and alloy 2 (Examples 2–6) over the range of temperature from room temperature to about 1800° F. Referring now thereto, curves 11, 13 and 14 show the ultimate tensile strength, the yield strength and percent elongation, respectively, of the alloy of Examples 2–6. Curves 12 and 15 show the ultimate tensile strength and percent elongation, respectively, of alloy B. FIG. 1 illustrates the improvement in tensile ductility provided by the inclusion of 1.5% hafnium in alloy 2–6 as indicated by the percents of elongation up to a temperature of about 1700° F. It will be noted by comparison of curves 14 and 15 that inclusion of hafnium substantially improves the ductility (as measured by percents of elongation) in the range room temperature to 1600° F. and in the range 1300° F. to 1600° F. and to 1800° F.

Figure 2:
FIG. 2 is reproduction of a photomicrograph of an alloy outside the ambit of the present invention.
Figure 2A:
FIG. 2A is a reproduction of a photomicrograph of an alloy (comparable to the alloy shown in FIG. 2) within the ambit of the present invention.
Figure 3:
FIG. 3 is a reproduction of a photomicrograph of another alloy outside the ambit of the present invention.
Figure 3A:
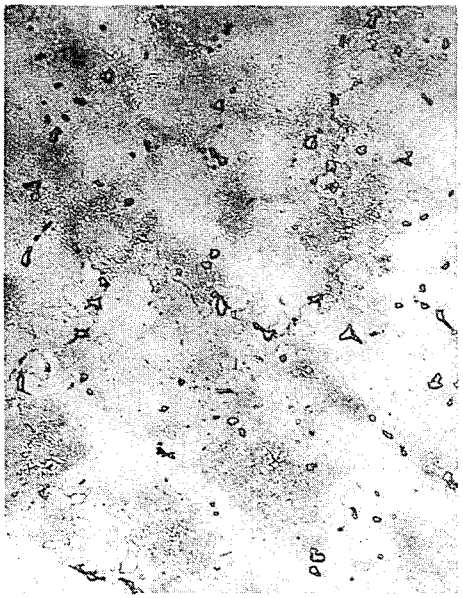
FIG. 3A is a reproduction of a photomicrograph of an alloy (comparable to the alloy shown in FIG. 3) within the ambit of the present invention.

FIGS. 2, 2A, 3 and 3A are reproductions of photomicrographs of alloys within and without the present invention. Each of these views shows the alloy as it appears at about 500× magnification, after polishing followed by etching in an etchant made up by adding 20 ml. each of hydrofluoric and nitric acids to 60 ml. of glycerol. FIG. 2 shows alloy B and FIG. 2A shows an alloy of the invention comprising essentially the composition of alloy B plus 1.5% hafnium added in place of an equal weight percent of nickel. It is to be noted that the script-type carbide phases visible in FIG. 2 do not appear in FIG. 2A. Furthermore, in FIG. 2A there appears to be much more primary gamma-prime phase than in FIG. 2. The same situation with respect to primary gamma-prime phase is visible in a comparison of FIGS. 3 and 3A. These figures illustrate the microstructures of alloy A and an alloy of the present invention (Examples 1–3) identical to alloy A except that 3.3% hafnium is substituted for all of the tantalum and part of the nickel (total 3.3% by weight) in alloy A. In castings made of the revert-containing alloy of the present invention containing in excess of about 0.7% hafnium, the grain boundaries are substantially free of continuous gamma-prime envelopes around discrete elongated carbides. Such structures which are common in castings of alloys devoid of hafnium tend to make the casting sensitive to shear at intermediate temperatures of about 1400° F.

In order to give those skilled in the art a full appreciation of the present invention, analyses of some alloys, in which hafnium is effective to overcome the effects of revert content, are contained in Table VII.

TABLE VII

|  | 1–1 | 1–2 | 1–3 | 2–1 | 2–2 | 2–3 | 2–4 | 2–5 | 2–6 |
|---|---|---|---|---|---|---|---|---|---|
| Al | 5.48 | 5.70 | 5.60 | 5.83 | 6.03 | 6.03 | 6.13 | 6.06 | 6.15 |
| B | .017 | .017 | .017 | 0.015 | 0.018 | 0.017 | 0.018 | 0.015 | 0.016 |
| C | .12 | .14 | .14 | 0.09 | 0.10 | 0.10 | 0.05 | 0.07 | 0.07 |
| Cr | 8.78 | 8.60 | 8.60 | 7.78 | 7.82 | 7.73 | 8.05 | 7.95 | 7.98 |
| Co | 10.1 | 10.0 | 9.85 | 9.88 | 9.80 | 9.78 | 9.79 | 9.79 | 9.72 |
| Mo | 2.52 | 2.47 | 2.43 | 6.00 | 5.77 | 5.75 | 6.05 | 6.10 | 6.12 |
| Ni | B | B | B | B | B | B | B | B | B |
| Ti | 1.50 | 1.54 | 1.59 | 1.08 | 1.06 | 1.05 | 1.03 | 1.08 | 1.08 |
| W | 9.90 | 9.80 | 9.55 | <0.1 | <0.1 | <0.1 |  |  |  |
| Zr | .12 | .11 | .14 | 0.09 | 0.07 | 0.13 | 0.13 | 0.15 | 0.16 |
| Hf | 1.50 | 2.20 | 3.30 | 0.49 | 1.10 | 1.40 | 0.53 | 1.03 | 1.55 |
| Ta |  |  |  | 4.40 | 4.27 | 4.32 | 3.88 | 3.25 | 2.73 |

In many alloys adapted to be treated in accordance with the present invention, ductility deficiencies appear to be much more pronounced in heats made using revert. For purposes of this specification and the appended claims a "heat made using revert" or a "revert heat" is a melt of alloy containing about 5% by weight or more of metal which has been previously remelted and cast in alloy form. For purposes of definition, revert heats occur when master alloy is first cast as ingot, the ingot is melted and cast into molds shaped in the form of the final object, excess items are cut from the cast product and these excess items are reverted into a subsequent heat either alone or with addition of fresh virgin ingot material. The practice of merely remelting a cast virgin ingot by itself does not result in a "revert" heat. As is well known in the casting art, a high proportion of metal cast is not recovered as cast product. For example, excess items such as sprues, gates, risers and the like are cut from the cast object and recycled. Revert heats of present day, state-of-the-art high temperature gas turbine alloys containing such recycled material of the same or different composition are likely to be deficient in one or more ways. Specifically if test specimens, machined from turbine blades made from revert-containing heats, are tested under creep inducing conditions at 1400° F., it is possible that such tests will indicate the existence of practically no ductility if the alloy is devoid of hafnium. On the other hand, if revert heats are modified to contain about 0.3% or 0.4% to about 1% or more hafnium, in accordance with the present invention, applicants have found that the revert-containing heats will provide hardware of a quality at least fully equivalent to the quality of hardware made from the best virgin heats. Applicants do not fully understand the factors involved in the aspect of the present invention which is concerned with improvement in the character of hardware produced from revert heats. It is thought, however, that use of revert inadvertently introduces certain types of undesirable impurities into the metal in very small, analytically undetectable amounts. Apparently hafnium has the ability to either combine with and effectively scavenge such impurities or to modify the metallurgical balance of the alloys in such a fashion so as to make the alloy less sensitive to the impurities. Additions of 0.3% hafnium or more also affects the microstructure of the alloy particularly in the formation of MC carbides and in the relationship of the gamma matrix with the "hardening" gamma prime. Regardless of the mechanism by which it operates, applicants' invention is, in part, the discovery that by treating revert heats to include small quantities of hafnium therein, the characteristics of such revert heats can be made to substantially equal, if not better, the characteristics of the best virgin heats of substantially the same alloy. It is to be understood that merely because a heat of alloy is made entirely with virgin materials, this does not necessarily mean that such a heat will inherently give excellent characteristics. Sometimes the problems which crop up in revert heats also appear in so-called "contaminated" virgin heats. It has been found that routine inclusion of hafnium in all heats of a particular alloy will reduce or eliminate the occurrence of the so-called "contaminated" virgin heats.

The ductility characteristics of revert-containing heats of alloy B and similar alloys of the present invention containing rafnium are shown in Tables VIII and IX and are illustrated in the drawing in FIG. 4. The data in Tables VIII and IX and illustrated in FIG. 4 were obtained on test samples machined from turbine blades. As mentioned hereinbefore, such test samples are now used to provide a vary sensitive indication of the ductility of the manufactured hardware. Table VIII contains room temperature tensile data. Table IX contains creep rupture data obtained at 1400° F. under a load of 85 k.s.i. and FIG. 4 shows creep curves for alloy B and Example 2–1.

TABLE VIII

|  | Percent Hf (nominal) | Room temperature U.T.S. (k.s.i.) | Room temperature .2% Y.S. (k.s.i.) | Elongation, percent |
|---|---|---|---|---|
| Alloy B | 0 | 115.9 | 108.4 | 3.5 |
| Example No.: |  |  |  |  |
| 2–1 | 0.5 | 118.9 | 107.4 | 6.0 |
| 2–2 | 1 | 122.7 | 108.4 | 6.0 |
| 2–3 | 1.5 | 130.3 | 109.0 | 9.5 |

Table VIII shows that inclusion of hafnium in the composition of alloy B clearly improves the ductility exhibited by specimens machined from blades made from revert-containing heats.

TABLE IX

|  | Percent Hf (nominal) | Life-to-rupture (hours) | Prior creep, percent |
|---|---|---|---|
| Alloy B | 0 | 13.4 | 0.42 |
| Example No.: |  |  |  |
| 2–1 | 0.5 | 177.2 | 3.98 |
| 2–2 | 1 | 131.8 | 2.18 |
| 2–3 | 1.5 | 136.9 | 2.91 |

The data in Table IX, especially the data as to alloy B, shows the loss of ductility attendant on the use of revert-containing heats and specimens machined from cast blades. The creep curve for alloy B is shown in FIG. 4 of the drawing as curve 17. The highly dramatic improvement achieved by including 0.5% hafnium in the composition of revert-containing heats of alloy B is illustrated by curve 16 on FIG. 4. Creep curve 16 is the curve of Example 2–1. In this particular instance there is a better than 100% improvement in life-to-rupture and at least an eight-fold increase in percent prior creep obtained by adding 0.5% by weight of hafnium to the composition of alloy B. Experience has indicated generally that revert-containing heats of hafnium-containing alloys of the present invention are substantially equivalent in merit to virgin heats of essentially the same alloy without hafnium. The practical effect of this aspect of the present invention is to allow engine builders to specify longer permissible turbine blade elongations prior to replacement with respect to run of production blades. In one particular instance involving a hafnium-free alloy, engine experience dictated blade replacement after only about .75% elongation even though blades of the production run made from all virgin heats could possibly exhibit twice this elongation without danger of cracking.

The data in Table X show the results of substituting hafnium for part of the tantalum in alloy B. The data was obtained on cast-to-size test bars.

TABLE X

|  | Percent Hf (nominal) | RTUTS (k.s.i.) | RTYS (k.s.i.) | Elongation, percent | Creep rupture, 1,400° F.– 85 k.s.i. (hours) | Prior creep, percent |
|---|---|---|---|---|---|---|
| Alloy B | 0 | 133.7 | 109.6 | 8.0 |  |  |
| Example No.: |  |  |  |  |  |  |
| 2–4 | 0.5 | 132.5 | 108.5 | 8.0 | 65.3 | 2.56 |
| 2–5 | 1 | 137.3 | 110.4 | 11.0 | 90.5 | 3.67 |
| 2–6 | 1.5 | 153.0 | 111.3 | 14.5 | 101.2 | 3.64 |

Similar data, obtained on cast-to-size test bars heat treated by holding at 1550° F. for 50 hours is shown in Table XI for alloy A and similar alloys of the present invention. In the alloys of the present invention hafnium replaces all the tantalum and a part of the nickel up to a total weight percent of nickel plus tantalum equal to the weight percent of the hafnium.

TABLE XI

| | Percent Hf (nominal) | RTUTS (k.s.i.) | RTYS (k.s.i.) | Elongation, percent | Creep rupture, 1,400° F.-105 k.s.i. | | Creep rupture, 1,800° F.- 34 k.s.i. (hours) |
|---|---|---|---|---|---|---|---|
| | | | | | Hours | Percent elongation | |
| Alloy A | 0 | 143 | 128 | 4.3 | 48 | 3.75 | 35 |
| Example No.: | | | | | | | |
| 1-1 | 1.5 | 157.6 | 136.1 | 5.0 | 113.9 | 9 | 25.9 |
| 1-2 | 2.2 | 176.5 | 142.7 | 7.0 | 69.9 | 9.5 | 18.4 |
| 1-3 | 3.3 | 162.6 | 144.5 | 4.0 | 123.1 | 9 | 11.9 |

Table XI shows the applicability of the present invention to alloy A and, in particular, demonstrates that, while relatively large amounts of hafnium can be employed, the desired improvements in ductility can be achieved by employing less than about 2% by weight of hafnium.

The present invention is particularly adapted to the production of nickel-base alloys resistant to the effects of high stress at high temperatures as discussed hereinbefore which alloys are also particularly resistant to loss of impact resistance upon exposure to high temperatures. It is known that in certain hafnium-free alloys of the kind here in question, exposure to temperatures of about 2000° F. for about 50 hours, no stress being applied, will result in a substantial loss of room temperature impact resistance. Data showing this loss with respect to alloy A and the dramatic improvement experienced when alloy A is modified by replacing 2.5% by weight of molybdenum with hafnium is shown in Table XII.

TABLE XII

| Alloy | Impact in foot-pounds sample "X" | | Impact in foot-pounds sample "Y" | |
|---|---|---|---|---|
| | As cast | After 50 hours at 2,000° F. | As cast | After 50 hours at 2,000° F. |
| Alloy A | 30-50 | 20-30 | 13-15 | 5 |
| Alloy containing Hf | 80-102 | 92 | 29-36 | 37-40 |

Note.—Sample "X" is an unnotched Charpy impact sample comprising a bar of square cross section 0.394" square; Sample "Y" is an unnotched Charpy impact sample comprising a round bar 0.283" in diameter.

The data in Table XII shows not only that the hafnium-containing alloy has a much greater initial impact value than that of the comparative alloy but also that exposure to high temperature (i.e. 2000° F. for 50 hours) does not reduce this impact value to any appreciable extent. The aspect of the present invention demonstrated by the data in Table XII is particularly applicable in conjunction with nickel-base, gamma-prime-hardened alloys which contain molybdenum. In the past molybdenum has proven to be an effective alloying element in alloys adapted to be used in hot stages of gas turbine engines. However, as engine temperatures rise and alloying content of both wrought and cast alloys also rises, service temperatures approach those at which certain deleterious carbide and other phases can form in the alloy. It is believed that replacement of molybdenum by hafnium inhibits the formation of these deleterious phases during service. The fact that substitution of hafnium for molybdenum does more than merely cure a deficiency of the molybdenum-containing alloys is clear from the data in Table XII. The room temperature impact resistance of the hafnium-containing alloy in the as-cast condition is sufficiently higher than the impact resistance of alloy A to indicate a significant advance in the art. The values in foot-pounds set forth in Table XII for the hafnium-containing alloy are substantially equivalent to those measured values exhibited by some alloys originally employed in aircraft gas turbine engines during development in Great Britain in the late 1930's and early 1940's. These British alloys had a temperature capability (defined as the temperature to produce rupture in 1000 hours at a stress of 20 k.s.i.) of no greater than about 1450° F. Alloy A and its hafnium-containing variation have a temperature capability of about 1780° F. To be able to produce the same resistance to suddenly applied force in cast alloys capable of use up to 1780° F. as is evidenced by alloys capable of use only up to 1450° F. is believed to be highly significant from the practical point of view of gas turbine designers.

Compositions of various alloys of the invention (in percent by weight) in which molybdenum has been replaced in whole or in part by hafnium and by virtue of which avoid any of the problems associated with revert are set forth in Table XIII.

TABLE XIII

| | 1-4 | 3 | 4 | 5 | 6 |
|---|---|---|---|---|---|
| C | 0.15 | 0.08 | 0.15 | 0.12 | 0.18 |
| Cr | 9.0 | 15 | 15 | 10.0 | 10 |
| Co | 10.0 | 18.5 | 15 | | 15 |
| Mo | | 2.0 | 1.0 | 1.5 | |
| W | 10.0 | | | 2.0 | |
| Ti | 1.5 | 3.5 | 4.0 | 1.0 | 4.7 |
| Al | 5.5 | 4.3 | 5.0 | 6.5 | 5.5 |
| B | 0.015 | 0.030 | | 0.020 | 0.014 |
| Zr | 0.05 | | | 0.10 | 0.06 |
| Ta | 1.5 | | | 2.0 | |
| Hf | 2.5 | 2.0 | 2.5 | 2.5 | 2.5 |
| Ni | Balance | Balance | Balance | Balance | Balance |
| Cb | | | | 1.0 | |
| V | | | | | 1.0 |

It is to be noted that the aspect of the process of the present invention whereby the impact resistance of a nickel-base alloy is substantially increased by inclusion of hafnium therein is particularly applicable to alloy containing in weight percent about 0.01% to about 0.25% carbon, about 8% to about 15% chromium, up to about 20% cobalt, up to about 2% molybdenum, up to about 10% tungsten, about 1% to about 5% titanium, about 4% to about 7% aluminum, about 0.4% to about 3% hafnium, up to about 4% tantalum, up to about 0.05% boron, up to about 0.3% zirconium, up to about 2% columbium (niobium), up to about 2% vanadium, and the balance being nickel along with impurities and incidental elements. These alloys contain a minimum of about 6% titanium plus aluminum so as to provide sufficient amounts of gamma-prime phase in the alloy to achieve high temperature capability. The alloys are also balanced such that the residual matrix of the alloy after precipitation or formation of gamma-prime and carbide phases will be reasonably stable against formation of sigma and other deleterious phases upon exposure to elevated temperatures. High temperature capability, stability and enhanced impact resistance make the alloys produced in accordance with this aspect of the process of the present invention highly advantageous and attractive. There is some evidence available that hafnium-containing alloys of the present invention can exhibit advantageous resistance to impact at temperatures up to about 1000° C. (1832° F.) even after having been subjected to 2000° F. for 50 hours. Various laboratory tests have been devised to simulate thermally fatiguing conditions. Generally the tests involve subjecting a sample of standardized weight and geometry to a thermal cycle involving rapidly heating up to a specific temperature, holding at temperature for a short period of time and rapidly cooling to the initial temperature. The resistance of a particular material to thermal fatigue is measured by the number of cycles endured until some indication of failure, such as a crack, is reached. Greater resistance to thermal fatigue is indicated by greater number of cycles-to-failure and vice versa. Using airfoil section samples of alloy B, it has been found that when the log of cycles-to-failure is plotted against the thickness of the trailing edge a straight line relationship is indicated. When alloy B is modified by substitution of about 1.5% hafnium for an equal percent by weight of nickel, samples made from the modified alloys at least equal the resistance to thermal fatigue exhibited by similar samples of alloy B. To be specific a sample of the modified alloy B having a trailing edge thickness of 0.056 inch lasted for 17,263 thermal fatigue cycles without failure at which point the test was discontinued. The normal unmodified alloy with the same trailing edge thickness would be expected to fail in about 7500 cycles. Samples having trailing edge thicknesses of 0.058 inch lasted without failure for 13,254 cycles at which points the tests were discontinued, whereas unmodified alloy of same trailing edge thickness would be expected to fail at 11,000 cycles.

As stated in the introductory portion of the present specification, the distribution of values for a given characteristic when said characteristic is measured on number of samples both of revert and of virgin metal is highly important to a designer of hardware. That an alloy is capable of exhibiting high values of any given characteristic is not particularly significant to a designer who must design on the basis of the minimum values of characteristics exhibited by an alloy. The problem presented by a wide scatter of values is particularly irksome with respect to alloys adapted to be used in service without mechanical working operations carried on after casting of metal. Cast alloys of the kind in question form a plurality of phases such as eutectic gamma-prime, gamma and carbide on solidification and the variations in freezing point of these phases normally introduces some segregation in the alloy. This segregation, along with other factors, can cause alloy articles of identical macro-chemical composition to vary considerably in measured values of mechanical characteristics of interest to the designers of turbine engine hardware.

One of the major problems encountered in alloys developed for use as cast, hot stage, gas turbine hardware is, as discussed hereinbefore, the problem of insuring adequate ductility in the alloy at temperatures of about 1400° F. By including about 1.0% and in excess of 1% to about 4.0% by weight of hafnium in nickel-base, gamma-prime-containing cast alloys from which hot stage gas turbine hardware is to be made, it is possible to produce highly reliable and consistent alloys which, when tested at 1400° F. under 94 k.s.i. stress, give relatively uniform, predictable failures during third stage creep.

Figure 5:
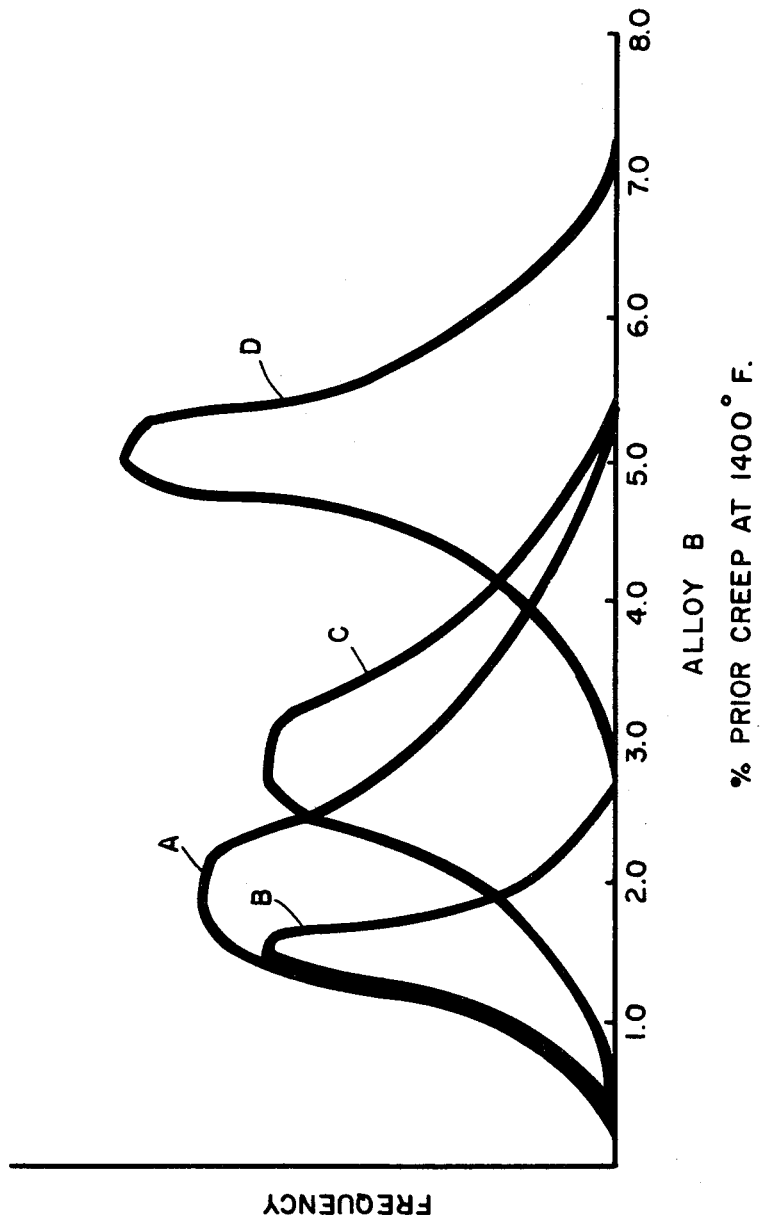
FIG. 5 is a graph illustrating the frequency of occurrence of values of percent prior creep in castings tested at 1400° F. both within and without the ambit of the present invention.
Figure 6A:
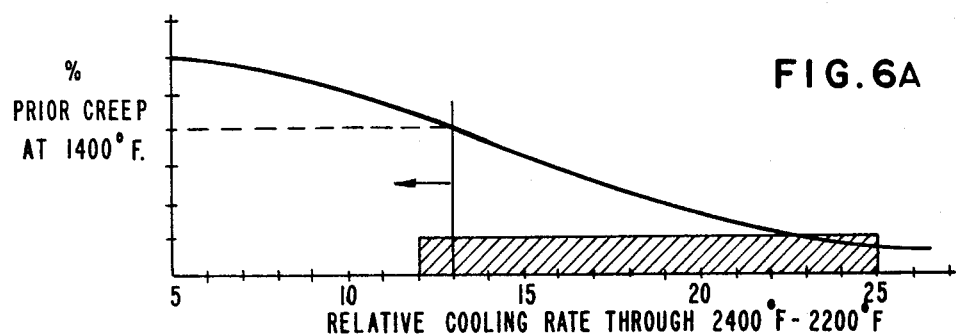
FIG. 6 is a series of graphs interrelating mechanical characteristics and relative cooling rates of castings through selected temperature ranges.
Figure 6B:
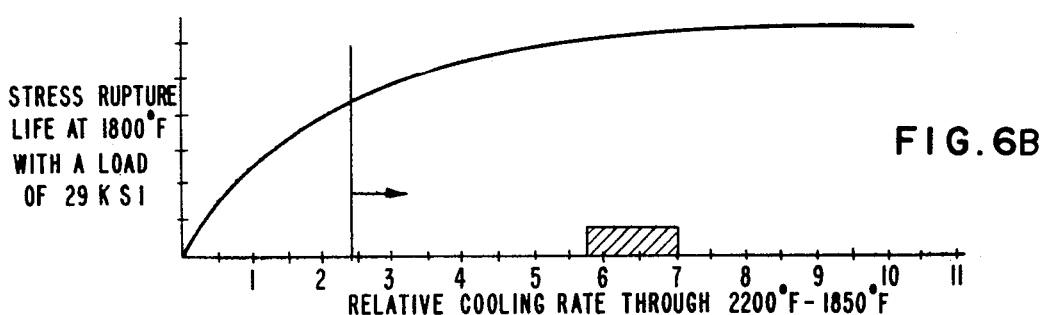
Figure 6C:
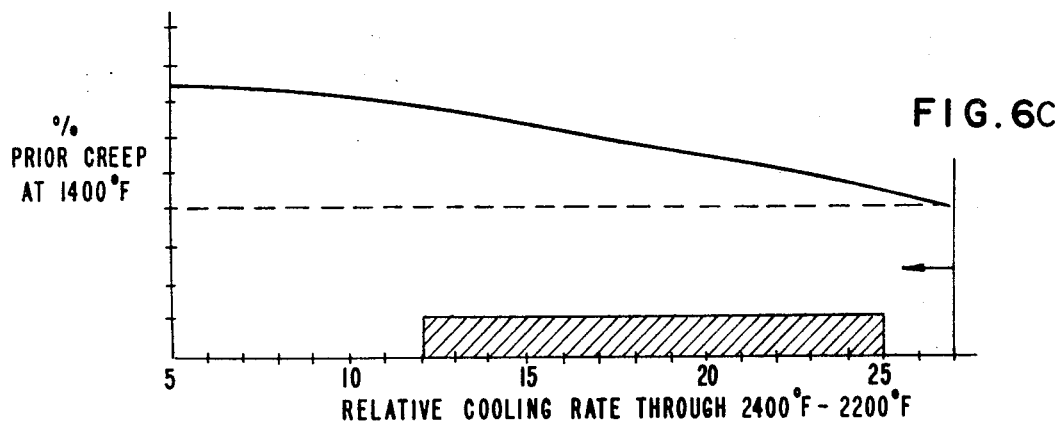
Figure 6D:
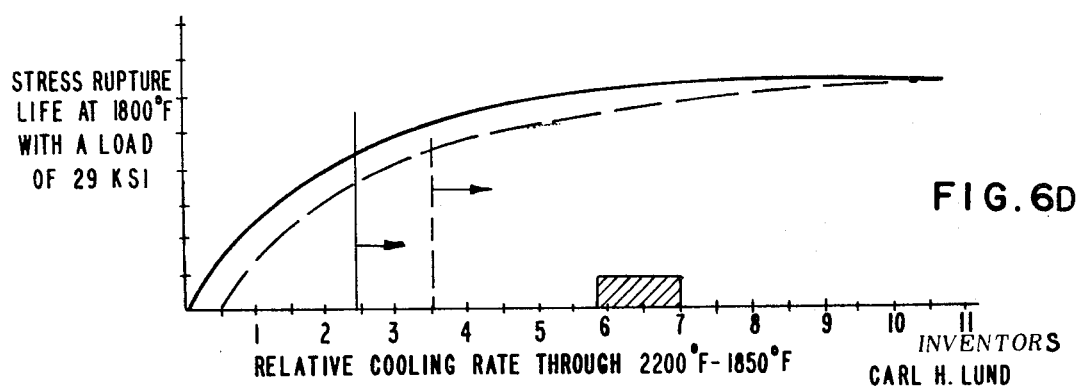
Figure 7:
Figure 8:
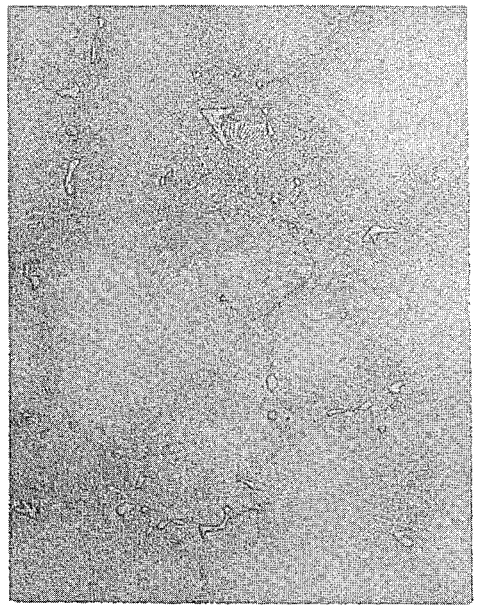
Figure 9:
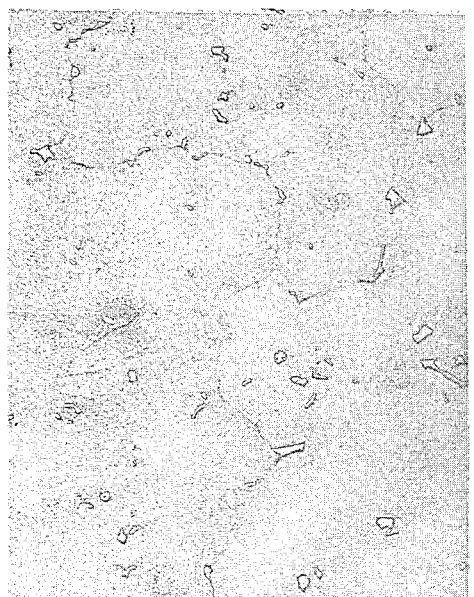
Figure 10:
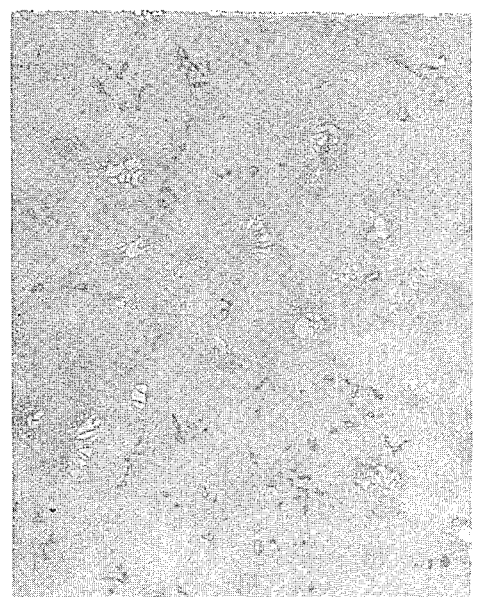
Figure 11:
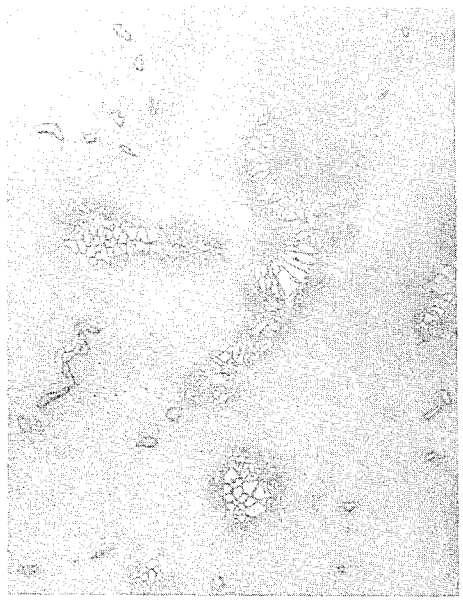
Figure 12:
Figure 13:
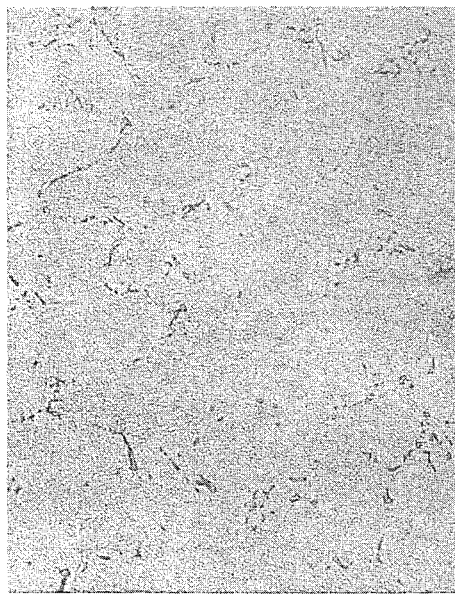
Figure 14:

Statistical analysis of a commercially produced alloy identified hereinbefore as alloy B indicates that the values for percent of prior creep exhibited when the alloy was tested in creep rupture at 1400° F. give a skewed distribution curve depicted as "A" in FIG. 5 of the drawing. Further analysis showed that this skewed curve was the result of a population distribution between virgin and revert heats. A somewhat different statistical analysis showed as depicted in FIG. 5 that curve A was a synthesis of second stage creep failure, curve B, and third stage creep failure, curve C. It is possible that the low values of both virgin and revert heats are caused by failure during second stage creep. Although such undesirable second stage creep failure is more prevalent in revert heats, it also occurs with virgin heats. Nine heats of alloys of the present invention were made having the composition of alloy B but containing amounts of hafnium from about 1% to about 2% in place of an equal weight percent of nickel. Five of these alloy heats were made using revert and four heats were made with virgin materials. Samples machined from blades made from these heats were tested at 1400° F. and 94 k.s.i. to determine life-to-rupture and percent prior creep. None of the alloys of the present invention failed in second stage creep indicating excellent reliability. The distribution curve for values of percent prior creep for these alloys is set forth as curve D in FIG. 5 and the data on which this curve is based is set forth in Table XIV.

TABLE XIV

| Heat No. | V or R[1] | Wt. percent Hf | 1,400° F./94,000 p.s.i. | |
|---|---|---|---|---|
| | | | Hours | Percent prior creep |
| 1 | V | 1.70 | 86.6 | 5.59 |
| | | | 91.1 | 5.76 |
| | | | 95.7 | 3.83 |
| | | | 87.7 | 4.51 |
| 2 | V | 1.40 | 75.3 | 3.80 |
| | | | 83.4 | 5.44 |
| | | | 69.1 | 4.02 |
| 3 | V | 1.29 | 119.7 | 7.42 |
| | | | 126.6 | 6.82 |
| | | | 91.1 | 4.66 |
| | | | 50.4 | 2.30 |
| | | | 65.5 | 5.85 |
| 4 | V | 1.40 | 65.7 | 3.56 |
| | | | 93.7 | 6.59 |
| | | | 61.9 | 3.46 |
| | | | 94.7 | 5.99 |
| 5 | R | 1.48 | 91.3 | 5.50 |
| | | | 91.4 | 5.40 |
| | | | 107.9 | 5.10 |
| | | | 85.3 | 5.08 |
| 6 | R | 1.64 | 85.2 | 4.51 |
| | | | 77.8 | 4.75 |
| | | | 97.6 | 4.71 |
| | | | 85.2 | 3.92 |
| 7 | R | 1.48 | 70.1 | 3.46 |
| | | | 78.2 | 4.08 |
| | | | 89.6 | 4.53 |
| | | | 104.3 | 5.55 |
| 8 | R | 1.06 | 97.8 | 6.07 |
| | | | 83.4 | 4.46 |
| | | | 108.1 | 7.1 |
| | | | 119.5 | 6.30 |
| 9 | R | 1.45 | 100.1 | 5.45 |
| | | | 76.0 | 4.30 |
| | | | 101.4 | 4.72 |
| | | | 63.1 | 2.62 |

[1] Virgin or Revert.

Statistical evaluation of the data in the foregoing table relating to percent prior creep indicating the following:

| | Virgin | Revert | Composite |
|---|---|---|---|
| Average, percent | 4.975 | 4.88 | 4.92 |
| Sigma | 1.423 | 1.01 | 1.19 |
| Measure of skewness | [1] 0.00013 | [1] 0.0000 | [1] 0.0000 |
| Measure of kurtosis | 0.1315 | 0.1659 | 0.074 |
| Number of data points | 16 | 20 | 36 |

[1] Distributions not skewed.

The same heats without additions of hafnium show an average ($\bar{X}$) of 1.37% prior creep with a standard deviation of 0.69. This is obviously substantially skewed as the $\bar{X}-2$ sigma value is an impossible negative value.

From the foregoing it was concluded that there is no significant difference between virgin and revert heats when amounts of hafnium in excess of about 1% are substituted for equal percents by weight of nickel in alloy B. Further, since the probability curve for values of percent prior creep of the alloys of the present invention is a normal probability curve, it is clear that better than 95% of samples of alloys of the present invention machined from blades can be expected to exhibit greater than 2.5 percent prior creep under the indicated test conditions. It is also interesting to note that the life-to-rupture of the alloys of the present invention, as reported in Table XIV, extended from a minimum of about 50 hours to a maximum of about 125 hours. Similarly tested samples of unmodified alloy B exhibited lives-to-rupture ranging from about 2 to about 28 hours.

Compositions (expressed in percent by weight) of additional examples of advantageous hafnium-containing alloys resistant to the deleterious effects of revert are set forth in Table XV.

TABLE XV

| Element: | Example number | | | | | |
|---|---|---|---|---|---|---|
| | 7 | 8 | 9 | 10 | 11 | 12 |
| C | 0.12 | 0.14 | 0.05 | 0.10 | 0.13 | 0.10 |
| Cr | 9 | 9 | 9 | 9.0 | 9.0 | 9.0 |
| Co | 9 | 9 | 9 | 10 | 10 | 10 |
| W | 9.9 | 9.6 | 10 | 12.2 | 11.5 | 11.8 |
| Mo | 2.5 | 2.4 | | | | |
| Ta | | | 1.5 | | | |
| Cb | | | | 1.0 | 1.1 | 1.0 |
| Ti | 1.5 | 1.5 | 1.5 | 2.0 | 2.0 | 2.0 |
| Al | 5.5 | 5.5 | 5.5 | 5.0 | 5.0 | 5.0 |
| Hf | 1.5 | 3.3 | 4.5 | 1.6 | 1.1 | 2.3 |
| Ni | (¹) | (¹) | (¹) | (¹) | (¹) | (¹) |
| Zr | .05 | .05 | .05 | .05 | .50 | .05 |
| B | .015 | .015 | .015 | .015 | .015 | .015 |

¹ Balance E.

Each of the examples in Table XV exhibit excellent combination of mechanical characteristics and are generally suited for use in the manufacture of gas turbine hardware by precision casting.

It is to be understood that, in formulating virgin alloys as well as in the process of the present invention with regard to the treatment of revert-containing melts, hafnium has been added in essentially the elemental form. Thus hafnium can be added as metallic hafnium, hafnium master alloy or possibly by means of intermetallic hafnium compounds. The hafnium has been included in molten alloy at a time after the melt has been refined, as by a carbon boil, and essentially killed. As is well known to those skilled in the art, it is highly advantageous to melt and cast alloys, of the kind considered herein, under high vacuum in order to avoid inclusion of deleterious amounts of oxygen, nitrogen, etc. in the alloy. Under certain conditions, however, alloys considered herein can be melted under inert gas or other protective blankets and cast in air provided due care is taken. While applicants do not fully understand the metallurgical mechanisms involved in the inclusion of hafnium in alloys of the kind discussed herein, it is now suspected that one possible part of the mechanism may involve inclusion in the alloy of an oxidic species of hafnium, e.g. hafnia. Accordingly, it is within the intent and scope of this description and claims to include within the scope thereof the inclusion of hafnium in alloys of the kind discussed hereinbefore without limitation as to the particular form in which this element may be added to or included within said alloys.

CASTING PROCESS

Generally speaking, the casting process aspect of the present invention contemplates a process wherein an alloy having a composition within the hereinbefore described ranges and having a nickel base and containing chromium and having in the solidified state a gamma matrix phase, a carbide phase dispersed in said matrix, a gamma prime precipitate and an essentially non-solutionable, eutectic gamma-prime phase dispersed in said matrix, is caused to contain about 0.5% to about 5% by weight and advantageously from in excess of 1% to about 5% of hafnium; is cast from the molten state into a mold having essentially the final configuration of use of the object thus cast; and is caused to solidify in said mold at a rate tending to maximize mechanical characteristics as measured at 1800° F. Advantageously, the melting, casting and solidification operations are carried out under high vacuum. Further, in order to maximize those conditions which tend to insure in the resultant casting good mechanical characteristics at 1800° F., it is advantageous to cool the casting rapidly through the range of 2200° F. to 1850° F. The process of the present invention, comprising a combination of processing operations and inclusion of critical amounts of hafnium on nickel-base alloys of a specified type, results in castings which not only have excellent mechanical characteristics at 1800° F. but also at the same time have excellent mechanical characteristics at intermediate temperatures of about 1400° F.

There are certain practical difficulties in demonstrating the advantages of the process of the present invention as applied to casting hot stage, gas turbine structures because many of such structures are of complex airfoil shaped cross section and are not adapted to provide more than one test specimen per casting. Thus it is difficult, if not impossible, to prove directly on cast hardware the efficacy of the invention. Consequently, indirect evidence based upon cast-to-size alloy test specimens cooled at various rates through the ranges of 2400° F. to 2200° F. and 2200° F. to 1800° F. is given to show the effects of the invention. It is important to note, however, that the mechanical characteristics exhibited by cast-to-size test specimens are not representative of the mechanical characteristics of items of cast hot-stage, gas turbine hardware. Rather, such cast-to-size specimens represent the mechanical characteristics of only that portion of the cast item which is subject to the same cooling treatment as the specimen. An actual cast item would exhibit a range of characteristics dependent upon the location from which a test specimen might be taken. Thus one of the important factors to be considered in evaluating the test data set forth herein is the relative size of the ranges of cooling rates which can be employed to give acceptable mechanical characteristics in castings. It is a major advantage of the process of the present invention that relatively wide ranges of cooling rates will produce acceptable mechanical characteristics at both 1800° F. and 1400° F. Thus, castings produced by the process of the present invention will contain much greater amounts of alloy thermally conditioned to give good mechanical characteristics at both 1800° F. and 1400° F. than are present in castings produced by prior processes.

A comparison of the process of the present invention and the processes of the prior art is shown in FIG. 6 of the drawing. In this figure are set forth four graphs, the upper pair of which represent the prior art and the lower pair of which represent the present invention. The data on which these graphs is based was obtained from a series of cast-to-size test bars made at various cooling rates spanning the range of cooling rates normally encountered in casting airfoil-shaped hot stage, gas turbine blades. Test bars representing relative cooling rates were tested for life-to-rupture at 1800° F. under a load of 29 k.s.i. and for percent prior creep (percentage of creep more than one hour prior to rupture) at 1400° F. under a load of 94 k.s.i. The alloys employed to give data for both pairs of graphs were identical nickel-base alloys containing eutectic gamma-prime phase as cast except that, in accordance with the requirements of the present invention, the alloy employed to obtain the data for the lower graph was caused to contain about 1.5% hafnium.

Graphs B and D of FIG. 6 show that the stress-rupture lives at 1800° F. of metal in castings is essentially unaffected by use of the process of the present invention. When the cooling rate is slow through the range of 2200° F. to 1850° F. the life-to-rupture of cast metal at 1800° F. under high stress is relatively poor. When the cooling rate is fast through this range, the life-to-rupture is relatively good. The minimum of an acceptable range of cooling rates is fixed by engineering judgment as to the minimum acceptable life-to-rupture at 1800° F. and is the same in both graphs. Essentially, the curve is the same in both of graphs B and D except that the curve of graph D (derived from alloy specimens containing hafnium) is drawn more diffuse to indicate the possibility that the process of the present invention may narrow slightly the range of cooling rates which give good stress-rupture characteristics at 1800° F. This slight narrowing is of no real practical significance since practically obtainable cooling rates indicated by the cross hatched boxes in FIG. 6 are safely within the acceptable range of cooling rates.

The curve representing percent prior creep is another matter. In the instance of graph A (based on alloys devoid of hafnium), the curve representing percent prior creep shows a high percent prior creep at a slow cooling rate through the range of 2400° F. to 2200° F. At very fast cooling rates the percent prior creep is very low and is unacceptable. The maximum of the acceptable range of cooling rates is fixed by engineering judgment as to the minimum acceptable percent prior creep. In graph C (derived from alloy specimens containing hafnium), the curve representing percent prior creep shows not only a higher value at very slow cooling rates but also a difference in slope such that at very fast cooling rates the percent prior creep is still above an acceptable level. The cross hatched boxes on graphs A and C show the range of cooling rates normally encountered in the cooling of gas turbine blade castings from 2400° F. to 2200° F. In the process of the invention this range of practical cooling rates is entirely within the acceptable range of cooling rates whereas in prior art processes, the acceptable range of cooling rates barely abuts on the range of cooling rates encountered in practice. The result of these phenomena, directly applicable to castings produced in accordance with the process of the present invention, is a large proportion of metal in, for example, a turbine blade casting, which has been subjected to a thermal history adapted to provide acceptable mechanical characteristics both at 1800° F. and 1400° F. In contrast, in the prior art processes, only that small amount of metal having a thermal history within the narrow acceptable ranges of cooling rates can be considered to have acceptable mechanical characteristics both at 1800° F. and 1400° F. It is to be noted that the graphs of FIG. 6, although based upon experimentally obtained and mathematically derived data, are diagrammatic in nature rather than precise and exact. The relative cooling rates have been expressed in dimensionless units which have been obtained from theoretically calculated, numerically identical, rates of cooling in degrees Fahrenheit per second. It is the intent of graphs A to D of FIG. 6 to show trends based on relative cooling rates rather than a prediction of specific results to be obtained for specific mechanical characteristics with specific cooling rates. For this reason specific values of mechanical characteristics have not been used, but rather only linear scales have been indicated. Another factor which tends to prohibit use of FIG. 6 as a precise tool is the probability that, at any increment of time during the cooling of a casting, every point within that casting will be cooling at a different rate from almost any other point. In calculating rates of cooling, one-half of a typical turbine blade section was divided into some 45 nodes with an additional 138 nodes being employed to characterize the surrounding refractory and boundaries. What was calculated and indicated in FIG. 6 as the range of cooling rates was the range of average rates of cooling through the two temperature ranges of three nodes representing metal from the leading edge, the trailing edge and mid-chord of the turbine blade. These average rates are set forth in Table XVI.

TABLE XVI

| Temperature range, ° F. | Cooling rates, ° F./second | | |
|---|---|---|---|
| | Trailing edge | Mid-chord | Leading edge |
| 2400–2200 | 24 | 25 | 12 |
| 2200–1850 | 5.8 | 7 | 6.9 |

Those skilled in the art will appreciate that the tabulated rates are themselves averages of rates over the range of temperature and further represent averages of rates of cooling of metal within each of the three-selected nodes. Accordingly, while the trends suggested by FIG. 6 are accurate and realistic as trends, FIG. 6 cannot be used to specify precisely the characteristics of any specified volume of metal in a casting. Process claims to the casting process described hereinabove are presented in application Ser. No. 841,408, filed July 14, 1969 of which this application is a continuation in part.

The castings of the present invention are characterized by substantial uniformity of basic metallographic structure across sections thereof even such sections as those cut transversely across an airfoil shape. In this regard, basic metallographic characteristics are intended to include the relationship of carbides and gamma-prime phase to the grain structure. The particular form in which the gamma-prime phase occurs within the grain structure is not particularly uniform across a transverse blade section but this species of non-uniformity does not appear to be detrimental. FIGS. 7 to 18 are photomicrographs in sets as tabulated in Table XVII.

TABLE XVII

| Fig. No. | Blade area | Alloy [1] | Invention |
|---|---|---|---|
| 7 | Trailing edge | A | No. |
| 8 | Center | A | No. |
| 9 | Leading edge | A | No. |
| 10 | Trailing edge | A plus 1.5% Hf | Yes. |
| 11 | Center | do | Yes. |
| 12 | Leading edge | do | Yes. |
| 13 | Trailing edge | B | No. |
| 14 | Center | B | No. |
| 15 | Leading edge | B | No. |
| 16 | Trailing edge | B plus 1.5% Hf | Yes. |
| 17 | Center | do | Yes. |
| 18 | Leading edge | do | Yes. |

[1] The composition of Alloys A and B are set forth hereinbefore.

In each instance of a casting of the invention, as shown in the drawing, the basic grain structure of the cast alloy is not readily visible. This is because carbides, which in prior art castings form preferably at the grain boundaries, are scattered throughout the grain structure in the castings of the present invention and thus do not outline the grain boundaries. Furthermore, gamma-prime envelopes which can form at grain boundaries in prior art castings are essentially absent in castings of the present invention. The absence of gamma prime envelopes surrounding discrete and elongated carbides is important because such envelopes tend to provide areas in the casting which are sensitive to shear at intermediate temperatures of about 1400° F. especially after the casting is exposed to conditions of time at elevated temperature sufficient to induce diffusion of carbon within the casting.

Additional alloy compositions useful in making cast hardware in accordance with the present invention are set forth in Table XVIII.

TABLE XVIII

| | 13 | 14 | 15 | 16 | 17 |
|---|---|---|---|---|---|
| Alloy: | | | | | |
| C | 0.15 | 0.12 | 0.18 | 0.05 | 0.12 |
| Cr | 9.0 | 10.0 | 10.0 | 12.0 | 12.5 |
| Co | 10.0 | | 15.0 | | |
| Mo | | 1.5 | | 4.5 | |
| W | 10.0 | 2.0 | | | |
| Ti | 1.5 | 1.0 | 4.7 | 0.6 | 0.8 |
| Al | 5.5 | 6.5 | 5.5 | 5.9 | 6.1 |
| B | 0.015 | 0.020 | 0.014 | 0.010 | |
| Zr | 0.05 | 0.10 | 0.06 | 0.10 | |
| Ta | 1.5 | 2.0 | | | |
| Hf | 2.5 | 2.5 | 2.5 | 1.5 | 1.5 |
| Ni | ([1]) | ([1]) | ([1]) | ([1]) | ([2]) |
| Cb | | 1.0 | | 2.0 | 2.0 |
| V | | | 1.0 | | |

[1] Balance.
[2] Balance, includes small conventional amounts of boron and zirconium.

The alloy compositions set forth throughout this specification which exemplify the utility of hafnium-containing alloys of the present invention are characterized by balanced compositions which tend to provide an optimum combination of alloy characteristics. Notably, the alloys of the present invention advantageously contain amounts (in percent by weight) of the solid solution strengtheners tungsten, molybdenum and tantalum such that the total percent by weight of these elements may be up to about 14% and advantageously the total is less than about 14%, e.g. up to about 12.5%. As exemplified, the tantalum content does not exceed about 4.5%. Generally, the exemplifying alloys set forth herein contain in percent by weight about 4.3% to 6.5% aluminum, about 0.05% to 0.18% carbon, about 7.73% to 15% chromium, up to about 18.5% cobalt, up to about 6.12% molybdenum, about 1.0% to about 4.7% titanium, up to 12.2% tungsten, about 0.49% to about 4.5% hafnium, up to about 4.40% tantalum, up to about 2% columbium, up to about 1.0% vanadium with the balance being essentially nickel together with small amounts of boron, zirconium, incidental elements and impurities which, in toto, do not alter the basic and novel characteristics of the invention. It will be appreciated with respect to zirconium that although the exemplary alloys of the present invention contain a maximum of about 0.15% of this element, impurity levels in commercially available hafnium may raise the zirconium content of commercially produced alloys to 0.2% or even as high as 0.3%. As will also be appreciated by those skilled in the art, boron and zirconium may be absent from the alloys of the present invention or present in only very small amounts, e.g. below about 0.002% by weight of each element. As exemplified the alloy compositions contain greater than 6% aluminum plus titanium and may range from values of about 6.5% and 6.9% to about 10.2% by weight. These alloys of the present invention can be employed to produce any kind of structure subjected in use to high stress at high temperatures. Among the articles which can be produced by means of the present invention are hot-stage, gas turbine items including gas turbine blades, gas turbine rotors, integral rotors and blades for gas turbines and nozzle guide vanes. The casting process described herein can be employed to manufacture such gas turbine items from nickel-base alloys which broadly can contain (in percent by weight) about 0.02% to about 0.5% carbon, about 7% to about 15% chromium, up to about 35% cobalt, up ot 14% tungsten, up to about 8% molybdenum, up to 5.5% tantalum, about 0.5% to about 6% titanium, about 4% to about 7% aluminum, at least about 6.5% total aluminum plus titanium and advantageously a maximum of about 10.5% aluminum plus titanium, up to 0.3% boron, up to 0.3% zirconium, up to 3% columbium, up to 1.5% vanadium and about 0.3% to about 4% or 5% hafnium. The maximum for the total of the percentages of tungsten, molybdenum and tantalum is about 14% and advantageously less than 14%, e.g. up to 12.5% and the hafnium is a minimum of 0.7% although it is known that hafnium, in certain instances, can be effective in amounts as low as 0.3% by weight.

While the present invention has been described in conjunction with advantageous embodiments, those skilled in the art will recognize that modifications and variations may be resorted to without departing from the spirit and scope of the invention. Such modifications and variations are considered to be within the purview and scope of the invention.

We claim:

1. An alloy specifically adapted for casting into form of cast hardware for use under stress at high temperatures, which alloy contains eutectic gamma-prime phase as-cast and consists of in weight percent about 0.02% to about 0.5% carbon, about 7% to about 13% chromium, up to about 35% cobalt, up to about 8% molybdenum, up to about 14% tungsten, up to about 3% columbium, up to 5.5% tantalum, the total of the percentages of tungsten, molybdenum and tantalum being up to 14%, about 4% to about 7% aluminum, about 0.5% to about 6% titanium, the total of the aluminum plus titanium being greater than about 6.5%, up to about 1.5% vanadium, up to about 0.3% boron, up to about 0.3% zirconium and in excess of 1% to about 5% hafnium with the balance being essentially nickel together with small amounts of impurities and incidental elements which do not detrimentally affect the basic characteristics of the alloy and nickel being present in at least about 36% by weight, said hafnium content being a selected amount within said range of in excess of 1% to about 5% to provide improved room temperature tensile elongation, said alloy having a hardenability factor of at least about 60, being adapted for use under stress at temperatures up to about 1900° F. and by virtue of the contained hafnium said alloy exhibiting in the cast, solidified state improved ductility at temperatures of about room temperature to about 1600° F. and enhanced reliability for production of cast hardware having a predictable high minimum limit on values of percent prior creep at 1400° F. based on test samples cut from hardware, when compared to similarly constituted alloys devoid of hafnium.

2. A castable alloy as in claim 1 which contains about 0.002% to about 0.2% boron, about 0.002% to about 0.2% zirconium, up to 5.0% tantalum and a maximum of 13% chromium and having a hardenability factor of about 60 to about 72.

3. Cast hardware for use under stress at high temperatures formed from a nickel-base alloy cast from molten state into a mold having essentially the final configuration of said hardware, said alloy containing eutectic gamma-prime phase as-cast and consisting of in weight percent about 0.02% to about 0.35% carbon, about 7% to about 13% chromium, up to about 35% cobalt, up to about 8% molybdenum, up to about 14% tungsten, up to about 3% columbium, up to 5% tantalum, the maximum for the total of the percentages of tungsten, molybdenum and tantalum being up to 14%, about 4% to about 7% aluminum, about 0.5% to about 6% titanium, the total of the aluminum plus titanium being greater than about 6.5%, up to about 1.5% vanadium, up to about 0.3% zirconium, up to about 0.2% boron and from in excess of 1% to about 5% hafnium with the balance being essentially nickel and nickel being present in at least about 36% by weight, said hafnium content being a selected amount within said range of from in excess of 1% to about 5% to provide improved room temperature tensile elongation, said alloy having a hardenability factor of about 60 to about 72, said alloy by virtue of the hafnium content being adapted for use under stress at temperatures up to about 1900° F. and exhibiting in the cast, solidified state improved ductility at temperatures of about room temperature to about 1600° F. and exhibiting increased percent prior creep under stress at 1400° F. based on samples cut from cast hardware, when compared to similarly constituted alloys devoid of hafnium.

4. A nickel-based alloy specifically adapted for casting into form of cast hardware for use under stress at high temperatures, which alloy contains eutectic gamma-price phase as-cast and consists of in weight percent about 0.02% to about 0.35% carbon, about 7% to about 13% chromium, up to about 20% cobalt, up to about 6% molybdenum, up to about 12% tungsten, up to about 3% columbium, up to 5% tantalum, the maximum for the total of the percentages of tungsten, molybdenum and tantalum being up to 12.5% and the maximum for the total of the percentages of tantalum plus chromium being 16%, about 4% to about 7% aluminum, about 5.0% to about 6% titanium, the total of the aluminum plus titanium being about 6.5% to about 10.5%, up to about 1.5% vanadium, about 0.02% to about 0.2% zirconium, about 0.002% to about 0.2% boron and from in excess of 1% to about 5% hafnium with the balance being essentially nickel together with small amounts of impurities and incidental elements which do not detrimentally affect the basic characteristics of the alloy, and nickel being present in at least about 36% by weight, said hafnium content being a selected amount within said range of in excess of 1% to about 5% to provide improved room temperature tensile elongation, said alloy having a hardenability factor of about 60 to 72, being adapted for use under stress at temperatures up to about 1800° F. to 1900° F. and by virtue of the contained hafnium exhibiting in the cast, solidified state improved ductility at temperatures of about room temperature to about 1600° F. and more consistently exhibiting a predictable high minimum limit on values of percent prior creep at 1400° F. based on test samples cut from hardware, when compared to similarly constituted alloys devoid of hafnium.

5. Cast hardware formed from a nickel-base alloy as in claim 3 wherein carbon content is about 0.02% to about 0.20%, the molybdenum content is up to about 6%, the tantalum content is up to about 4.5%, the hafnium content is from above 1% to about 4%, the boron content is up to 0.2%, the zirconium content is about 0.02% to about 0.2% and the total of the percentages of aluminum plus titanium being about 6.9% to about 10.2%.

6. Cast gas turbine engine hardware made from a nickel-base alloy melted and cast essentially in the absence of air containing eutectic gamma-prime phase as-cast and consisting of in weight percent about 0.02% to about 0.35% carbon, about 7% to about 13% chromium, up to about 35% cobalt, up to about 6% molybdenum, up to about 14% tungsten, up to about 3% columbium, up to 5.0% tantalum, the total of the percentages of tungsten, molybdenum and tantalum being up to 14%, about 4% to about 7% aluminum, about 0.5% to about 6% titanium, the total of the aluminum plus titanium being about 6.5% to about 10.5%, up to about 1.5% vanadium, about 0.02% to about 0.2% zirconium, about 0.002% to about 0.2% boron and from in excess of 1% to about 4% hafnium with the balance being essentially nickel and nickel being present in at least about 36% by weight, said hafnium content being a selected amount within the range of from in excess of 1% to about 4% to provide improved room temperature tensile elongation, said alloy having a hardenability factor of about 60 to about 72, being adapted for use under stress at temperatures up to about 1800° F. to 1900° F. and by virtue of said hafnium content exhibiting in the cast, solidified state improved ductility at temperatures of about room temperature to about 1600° F. and consistently exhibiting a predictable high minimum limit on values of percent prior creep at 1400° F. based on test samples cut from hardware, when compared to similarly constituted alloys devoid of hafnium.

7. A castable alloy for casting high temperature turbine engine hardware containing eutectic gamma-prime phase as-cast and consisting of in weight percent about 0.02% to about 0.5% carbon, about 7% to about 13% chromium, up to about 35% cobalt, up to about 8% molybdenum, up to about 2% tungsten, up to about 3% columbium, up to 5.0% tantalum, the maximum for the total of the percentages of tungsten, molybdenum and tantalum being 14%, about 4% to about 7% aluminum, about 0.5% to about 6% titanium, the total of the aluminum plus titanium being at least 6.5% up to about 1.5% vanadium, up to about 0.3% zirconium, up to about 0.3% boron, and about 0.7% to about 5% hafnium with the balance being essentially nickel together with small amounts of impurities and incidental elements which do not detrimentally affect the basic characteristics of the alloy and nickel being present in at least about 36% by weight, said hafnium content being a selected amount within the range of about 0.7% to about 5% to provide improved room temperature tensile elongation, said alloy having a hardenability factor of at least about 60, being adapted for use under stress at temperatures up to about 1900° F. and by virtue of the contained hafnium exhibiting in the cast, solidified state improved ductility at temperatures of about room temperature to about 1600° F. and enhanced reliability for production of cast hardware having a predictable high minimum limit on values of percent prior creep at 1400° F., when compared to similarly constituted alloys devoid of hafnium.

8. A castable alloy specifically adapted to be employed in cast condition under high stress at high temperatures as gas turbine engine hardware, said alloy containing eutectic gamma-prime phase as-cast and consisting of in weight percent about 0.02% to about 0.2% carbon, about 7% to about 11% chromium, up to about 35% cobalt, up to about 6% molybdenum, up to about 12% tungsten, up to about 3% columbium, up to 4.5% tantalum, the total of the percentages of tungsten, molybdenum and tantalum being up to 14%, about 4% to about 7% aluminum, about 0.5% to about 6% titanium, the total of the aluminum plus titanium being about 6.9% to about 10.2%, up to about 1.5% vanadium, about 0.02% to about 0.15% zirconium, about 0.002% to about 0.02% boron and in excess of 1% to about 4% hafnium with the balance being essentially nickel and nickel being present in at least about 36% by weight, said hafnium content being a selected amount within the range of in excess of 1% to about 4% to provide improved room temperature tensile elongation, said alloy having a hardenability factor of at least about 60, and by virtue of the contained hafnium said alloy being adapted for use under stress at temperatures up to about 1900° F. and exhibiting in the cast, solidified state improved ductility at temperatures of about room temperature to about 1600° F. and increased percent prior creep under stress at 1400° F., when compared to similarly constituted alloys devoid of hafnium.

9. A castable alloy adapted for casting hardware for use under stress at temperatures up to about 1800° F. to 1900° F., said alloy containing eutectic gamma-prime phase as-cast and having a composition of one of the alloys, A, B, C, D, E or F as tabulated herein in percent by weight:

|    | A | B | C | D | E | F |
|----|---|---|---|---|---|---|
| C  | 0.15 | 0.10 | 0.15 | 0.12 | 0.18 | 0.05 |
| Cr | 9.0 | 8.0 | 9.0 | 12.5 | 10.0 | 12.0 |
| Co | 10.0 | 10.0 | 10.0 |  | 15.0 |  |
| W  | 10.0 |  | 12.5 |  |  |  |
| Mo | 2.5 | 6.0 |  | 4.2 | 3.0 | 4.5 |
| Ta | 1.5 | 4.25 |  |  |  |  |
| Ti | 1.5 | 1.0 | 2.0 | 0.8 | 4.7 | 0.6 |
| Al | 5.5 | 6.0 | 5.0 | 6.1 | 5.5 | 5.9 |
| Cb |  |  | 1.0 | 2.0 |  | 2.0 |
| V  |  |  |  |  | 1.0 |  | wherein the alloy contains a selected amount of hafnium within the range of from in excess of 1% to 4% to provide improved room temperature tensile elongation and wherein the balance of the alloy is nickel together with about 0.002% to about 0.02% boron, about 0.02% to about 0.2% of zirconium, and impurities and incidental elements which do not change the basic and novel characteristics of the alloy, said alloy by virtue of the contained hafnium exhibiting in the cast, solidified state improved ductility at temperatures of about room temperature to about 1600° F. and increased percent prior creep under stress at 1400° F., when compared with similarly substituted alloys devoid of hafnium.

10. A castable alloy adapted for casting hardware for use under stress at temperatures up to about 1800° F. to 1900° F., said alloy containing eutectic gamma-prime phase as-cast and consisting essentially, in weight percent, of about 0.10% to 0.18% carbon, and about 7% to 11% chromium, about 6% to 13% cobalt, about 8% to 12% tungsten, up to about 3% molybdenum, up to about 3% tantalum, the maximum for the total of the percentages of tungsten, molybdenum and tantalum being 14%, about 1% to 2% titanium, about 5% to about 6% aluminum, the total percentage of aluminum plus titanium being greater than 6%, about 0.004% to 0.02% boron, about 0.02% to about 0.2% zirconium and from in excess of 1% to 4% hafnium with the balance being essentially nickel, said hafnium content being a selected amount within the range from in excess of 1% to about 4% to provide improved room temperature tensile elongation, said alloy having a hardenability factor greater than about 60, and by virtue of the contained hafnium said alloy exhibiting in the cast, solidified state improved ductility at temperatures of about room temperature to about 1600°

F. and increased percent prior creep under stress at 1400° F., when compared with similarly constituted alloys devoid of hafnium.

11. A castable alloy adapted for casting hardware for use under stress at temperatures up to about 1800° F. to 1900° F., said alloy consisting essentially, in weight percent, of about 0.03% to 0.13% carbon, about 7% to 10% chromium, about 6% to 13% cobalt, up to about 2% tungsten, about 4% to 8% molybdenum, about 2.5% to 4.5% tantalum, the maximum for the total of the percentages of tungsten, molybdenum and tantalum being 14%, about 0.5% to 1.5% titanium, about 5.5% to 6.5% aluminum, the total percentage of aluminum plus titanium being greater than 6%, about 0.004% to 0.02% boron, about 0.02% to about 0.2% zirconium and about 1% to 4% hafnium with the balance being essentially nickel, said hafnium content being a selected amount within the range of about 1% to about 4% to provide improved room temperature tensile elongation, said alloy having a hardenability factor of at least about 60, and by virtue of the contained hafnium said alloy exhibiting in the cast, solidified state improved ductility at temperatures of about room temperature to about 1600° F. and increased percent prior creep under stress at 1400° F., when compared with similarly constituted alloys devoid of hafnium.

12. A castable alloy adapted for casting hardware for use under stress at temperatures up to about 1800° F. to 1900° F., said alloy consisting essentially, in weight percent, of about 0.02% to 0.18% carbon, about 12% chromium, about 4.5% molybdenum, about 0.6% titanium, about 5.9% aluminum, about 0.004% to about 0.2% boron, up to about 0.2% zirconium, about 2.0% columbium, about 0.7% to about 5% hafnium, with the balance being essentially nickel, said hafnium content being a selected amount within the range of about 0.7% to about 5% to provide improved room temperature tensile elongation, and by virtue of the contained hafnium said alloy exhibiting in the cast, solidified state improved ductility at temperatures of about room temperature to 1600° F. and exhibiting enhanced reliability for production of cast hardware having a predictable high minimum limit on values of percent prior creep under stress at 1400° F. and exhibiting increased percent prior creep under stress at 1400° F., when compared with similarly constituted alloys devoid of hafnium.

13. A castable alloy containing more than 5% by weight of previously melted and cast alloy and containing eutectic gamma-prime phase as-cast and consisting of in weight percent about 0.05% to about 0.18% carbon, about 7.73% to about 15% chromium, up to about 18.5% cobalt, up to about 6.12% molybdenum, up to about 12.2% tungsten, up to about 2% columbium, up to 4.4% tantalum, the total of the percentages of tungsten, molybdenum and tantalum being up to 12.5% by weight and the maximum for the total of the percentages of chromium plus tantalum being 16%, about 4.3% to about 6.5% aluminum, about 1.0% to about 4.7% titanium, the total of the percentages of aluminum plus titanium being about 6.5% to about 10.5%, up to about 1.0% vanadium, about 0.002% to about 0.3% boron, about 0.2% to about 0.3% zirconium, and about 0.49% to about 4.5% hafnium with the balance being essentially nickel together with small amounts of impurities and incidental elements which do not detrimentally affect the basic characteristics of the alloy, and the nickel being present in at least 36% by weight, said alloy having a hardenability factor of about 60 to about 72, being adapted for use under stress at temperatures up to about 1800° F. to 1900° F. and said alloy by virtue of inclusion of said hafnium exhibiting in the cast, solidified state improved ductility at temperatures of about room temperature to about 1600° F. and particularly exhibiting substantially increased percent tensile elongation at room temperature and increased percent prior creep at 1400° F. and enhanced reliability for production of cast hardware having a predictable high minimum limit on values of percent prior creep at 1400° F., when compared to similiarly constructed alloys devoid of hafnium.

14. A castable alloy specifically adapted to be employed in cast condition at high temperatures, said alloy having enhanced impact resistance characteristics, containing eutectic gamma-prime phase as-cast and consisting of in weight percent about 0.01% to about 0.25% carbon, about 8% to about 15% chromium, up to about 20% cobalt, up to about 2% molybdenum, up to about 10% tungsten, up to about 2% columbium, up to 4% tantalum, the maximum for the total of the percentages of tungsten, molybdenum and tantalum being 12.5% and the maximum for the total of the percentages of chromium and tantalum being 16%, about 4% to about 7% aluminum, about 1% to about 5% titanium, the total of said aluminum plus titanium being 6.5% to 10.5%, up to about 2.0% vanadium, up to about 0.3% zirconium, up to about 0.05% boron and from in excess of 1% to about 3% hafnium with the balance being essentially nickel and the nickel being present in at least 36% by weight, said hafnium content being a selected amount within the range of in excess of 1% to about 3% to provide improved room temperature tensile elongation, said alloy having a hardenability factor of about 60 to about 72, being adapted for use under stress at temperatures up to about 1800° F. to 1900° F. and by virtue of the contained hafnium exhibiting in the cast, solidified state improved ductility at temperatures of about room temperature to about 1600° F. and improved room temperature impact resistance even after being subjected to temperatures of about 2000° F. for 50 hours, when compared to similarly constituted alloys devoid of hafnium.

15. A castable alloy specifically adapted to be employed in cast condition under high stress at high temperatures as gas turbine engine hardware, said alloy containing eutectic gamma-prime phase as-cast and consisting of in weight percent about 0.02% to about 0.2% carbon, about 7% to about 13% chromium, up to about 35% cobalt, up to about 8% molybdenum, up to about 14% tungsten, up to about 3% columbium, up to 4.5% tantalum, the total of the percentages of tungsten, molybdenum and tantalum being up to 14%, about 4% to about 7% aluminum, about 0.5% to about 6% titanium, the total of the percentages of aluminum and titanium being about 6.9% to about 10.2%, up to about 1.5% vanadium, up to about 0.2% zirconium, about 0.002% to about 0.02% boron and from in excess of 1% to about 4% hafnium with the balance being essentially nickel and nickel being present in at least about 36% by weight, said hafnium content being a selected amount within the range of from in excess of 1% to about 4% to provide improved room temperature tensile elongation, said alloy having a hardenability factor greater than about 60, being adapted for use under stress at temperatures up to about 1900° F. and by virtue of the contained hafnium exhibiting in the cast, solidified state improved ductility at temperatures of about room temperature to about 1600° F. and increased percent prior creep under stress at 1400° F., when compared to similarly constituted alloys devoid of hafnium.

16. A castable alloy adapted for casting hardware for use under stress at temperatures up to about 1800° F. to 1900° F., said alloy containing eutectic gamma-prime phase as-cast and consisting of in weight percent about 0.15% carbon, about 9% chromium, about 10% cobalt, about 12.5% tungsten, about 1% columbium, about 5% aluminum, about 2% titanium, up to 0.02% boron, up to about 0.2% zirconium, and from in excess of 1% to about 4% hafnium with the balance being essentially nickel together with small amounts of impurities and incidental elements which do not deleteriously affect the basic characteristics of the alloy, said hafnium content being a selected amount within the range of from in excess of 1% to about 4% to provide improved room temperature tensile elongation, said alloy having a hardenability factor greater than 60, being adapted for use under stress at temperatures up to about 1900° F. and by virtue of the hafnium content exhibiting in the cast, solidified state improved ductility at temperatures of about room temperature to about 1600° F. and increased percent prior creep under stress at 1400° F. based on test samples cut from hardware, when compared to similarly constituted alloys devoid of hafnium.

17. Cast hardware for use under stress at high temperatures formed from a nickel base alloy cast from molten state into a mold having essentially the final configuration of said hardware, said alloy containing eutectic gamma-prime phase as-cast and consisting essentially, in weight percent, of about 0.10% to 0.18% carbon, about 7% to 11% chromium, about 6% to 13% cobalt, about 8% to 12% tungsten, about 2% to 3% molybdenum, up to about 3% tantalum, the total of the percentages of tungsten, molybdenum and tantalum being up to 14%, about 1% to 2% titanium, about 5% to about 6% aluminum, the total of the percentages of aluminum plus titanium being greater than 6%, about 0.004% to 0.02% boron, about 0.02% to 0.2% zirconium and from in excess of 1% to 4% hafnium with the balance being essentially nickel, said hafnium content being an amount within the range of from in excess of 1% to about 4% to provide improved room temperature tensile elongation, said alloy having a hardenability factor of about 60 to about 72, and said alloy being adapted for use under stress at temperatures up to about 1900° F. and by virtue of the contained hafnium being characterized by improved ductility at temperatures of about 1300° F. to about 1600° F. and increased percent prior creep at 1400° F. based on test samples cut from hardware, when compared to similarly constituted alloys devoid of hafnium.

18. A process for minimizing the deleterious effects of revert content on heats of alloy having a base of nickel or nickel and cobalt, said alloy consisting essentially (in percent by weight) of about 0.02% to about 0.5% carbon, about 7% to about 18% chromium, up to about 35% cobalt, up to about 14% tungsten, up to about 8% molybdenum, up to about 5.5% tantalum, the total of the percentages of tungsten, molybdenum and tantalum being up to about 14%, up to about 6% titanium, about 4% to about 7% aluminum, the total of the aluminum plus titanium being about 6% to about 12%, up to about 3% columbium and up to about 1.5% vanadium, up to about 0.3% boron, up to about 0.3% zirconium, with the balance being essentially nickel together with small amounts of impurities and incidental elements which do not deleteriously affect the basic characteristics of said alloy, said nickel being present in at least 36% by weight and said alloy being especially adapted to be cast into substantially final shape and capable of being used in the cast condition under load at temperatures in excess of about 1650° F., comprising including along with at least 5% previously melted and cast alloy about 0.3% to about 5% hafnium in said alloy prior to casting to thereby neutralize the deleterious effect of revert content on the thus treated heat and casting said revert containing alloy.

19. A process as in claim 18 wherein the alloy contains a maximum of 13% chromium, up to 5% tantalum, greater than 0.5% hafnium, up to 0.2% boron and up to 0.3% zirconium, the total of the percentages of aluminum plus titanium being about 6.5% to 10.5% and said alloy having a hardenability factor of about 60 to about 72 and wherein said alloy is held under high vacuum while hafnium is incorporated and during the casting of said alloy.

20. A process for minimizing the deleterious effects of revert content on heats of alloy having a base of nickel or nickel and cobalt, said alloy consisting essentially (in perecnt by weight) of about 0.02% to about 0.35% carbon, about 7% to about 13% chromium, up to about 35% cobalt, up to about 14% tungsten, up to about 8% molybdenum, less than about 5% tantalum, the total of the percentages of tungsten, tantalum and molybdenum being up to 14%, about 0.5% to about 6% titanium, about 4% to about 7% aluminum, the total of the aluminum plus titanium being at least 6.5%, up to 0.2% boron, up to about 0.3% zirconium, up to about 3% columbium and up to about 1.5% vanadium, with the balance being essentially nickel, said alloy having a hardenability factor of about 60 to about 72 and said alloy being especially adapted to be cast into substantially final shape and capable of being used in the cast condition under load at temperatures in excess of about 1650° F., comprising including along with at least 5% of previously melted and cast alloy about 0.7% to about 5% hafnium in said alloy prior to casting to thereby neutralize the deleterious effect of revert content on the thus treated heat and to provide improved room temperature tensile elongation, improved ductility at temperatures from room temperature to about 1600° F. and enhanced reliability for production of cast hardware having a predictable high minimum limit on values of percent prior creep at 1400° F. based on test samples cut from hardware castings of the alloy, when compared to similarly constituted alloys devoid of hafnium, and casting said revert containing alloy.

21. A process for minimizing the deleterious effects of revert content on heats of alloy having a base of nickel or nickel and cobalt, said alloy consisting essentially (in percent by weight) of about 0.02% to about 0.2% carbon, about 7% to about 13% chromium, up to about 35% cobalt, up to about 12% tungsten, up to about 8% molybdenum, up to about 4.5% tantalum, the total of the percentages of tungsten, tantalum and molybdenum being up to about 12.5%, about 0.5% to about 6% titanium, about 4% to about 7% aluminum, the total of the aluminum plus titanium being 6.5% to about 10.5%, up to about 0.2% boron, about 0.02% to about 0.3% zirconium, up to about 3% columbium and up to about 1.5% vanadium with the balance being essentially nickel together with small amounts of impurities and incidental elements which do not detrimentally affect the basic characteristics of said alloy, the nickel being present in an amount of at least 36% by weight, said alloy having a hardenability factor greater than 60 and said alloy being especially adapted to be cast into substantially final shape and capable of being used in the cast condition under load at temperatures in excess of about 1650° F., comprising including along with at least 5% of previously melted and cast alloy about 0.5% to about 5% of hafnium in said alloy prior to casting to thereby neutralize the deleterious effect of revert content on the thus treated heat and to provide improved room temperature tensile elongation and improved ductility at temperatures of about room temperature to about 1600° F. and increased percent prior creep at 1400° F. based on test samples cut from castings of the alloy, when compared to similarly constituted alloy devoid of hafnium, and casting said revert containing alloy.

22. A process as in claim 21 wherein the alloy contains a maximum of 0.2% zirconium and a minimum in excess of 1% hafnium is included therein and the alloy has a hardenability factor within the range about 60 to about 72.

23. A process for minimizing the deleterious effects of revert content on heats of alloy having a base of nickel or nickel and cobalt, said alloy consisting essentially (in percent by weight) of about 0.02% to about 0.35% carbon, about 7% to about 11% chromium, up to about 35% cobalt, up to about 12% tungsten, up to about 8% molybdenum, less than 5% tantalum, the total of the percentages of tungsten, tantalum and molybdenum being up to 12.5%, about 0.5% to about 6% titanium, about 4% to about 7% aluminum, the total of the aluminum plus titanium being about 6.5% to about 10.5%, up to about 0.2% boron, up to about 0.3% zirconium, up to about being at least about 6.5%, about 0.004% to 0.02% boron, up to about 0.3% zirconium and about 0.7% to 5% hafnium with the balance being essentially nickel, said hafnium content being a selected amount within the range of about 0.7% to about 5% to provide improved room temperature tensile elongation, said alloy having a hardenability factor of about 60 to about 72, and said alloy by virtue of the contained hafnium exhibiting in the cast, solidified state improved ductility at temperatures of about room temperature to about 1600° F., increased percent prior creep under stress at 1400° F. and enhanced reliability for casting of hardware having a predictable high minimum limit on values of percent prior creep under stress at 1400° F. based on test samples cut from hardware, when compared to similarly constituted alloys devoid of hafnium.

37. Cast hardware made from nickel base alloy containing more than about 5% by weight of previously melted and cast alloy and consisting essentially, in weight percent, of about 0.02% to about 0.18% carbon, about 12% chromium, about 4.5% molybdenum, about 0.6% titanium, about 5.9% aluminum, about 0.004% to about 0.2% boron, up to about 0.3% zirconium, about 2.0% columbium, about 0.7% to about 4% hafnium, with the balance being essentially nickel, said hafnium content being a selected amount within the range of about 0.7% to about 5% to provide improved room temperature tensile elongation, and said alloy by virtue of the contained hafnium exhibiting in the cast, solidified state improved ductility at temperatures of about room temperature to about 1600° F., increased percent prior creep under stress at 1400° F. and enhanced reliability for casting of hardware having a predictable high minimum limit on values of percent prior creep under stress at 1400° F. based on test samples cut from hardware, when compared to similarly constituted alloys devoid of hafnium.

38. A casting having a substantially non-symmetrical configuration, characterized by a substantial uniformity of basic metallographic structure across sections thereof and characterized by improved room temperature tensile elongation, and said alloy by virtue of the contained hafmetal thermally conditioned to exhibit good mechanical characteristics at both high temperatures about 1800° F. and at intermediate temperatures about 1400° F. and made from a vacuum-cast nickel-base alloy containing eutectic gamma-prime phase as-cast and consisting of in weight percent about 0.02% to about 0.5% carbon, about 7% to about 13% chromium, up to about 35% cobalt, up to about 8% molybdenum, up to about 14% tungsten, up to about 3% columbium, up to 5.5% tantalum, the total of the percentages of tungsten, molybdenum and tantalum being up to 14%, about 4% to about 7% aluminum, about 0.5% to about 6% titanium, the total of the aluminum plus titanium being greater than about 6.5%, up to about 1.5% vanadium, up to about 0.2% boron, up to about 0.3% zirconium, and in excess of 1% to about 5% hafnium with the balance being essentially nickel together with up to small amounts of impurities and incidental elements which do not detrimentally affect the basic characteristics of the alloy, and nickel being present in at least about 36% by weight, said hafnium content being a selected amount within said range of in excess of 1% to about 5% to provide improved room temperature tensile elongation and said alloy having a hardenability factor greater than about 60, and by virtue of the contained hafnium said alloy exhibiting in the cast, solidified state improved ductility at temperatures of about room temperature to about 1600° F. and enhanced reliability for production of cast hardware having a predictable high minimum limit on values of percent prior creep under stress at 1400° F., when compared with similarly constituted alloys devoid of hafnium.

39. A casting having a substantially non-symmetrical configuration, characterized by a substantial uniformity of basic metallographic structure across sections thereof and characterized by improved room temperature tensile elongation and by a relatively large proportionate volume of metal thermally conditioned to exhibit good mechanical characteristics at both high temperatures about 1800° F. and at intermediate temperatures about 1400° F. and made from a vacuum melted and vacuum-cast nickel-base alloy containing eutectic gamma-prime phase as-cast and consisting of in weight percent about 0.02% to about 0.35% carbon, about 7% to about 13% chromium, up to about 20% cobalt, up to about 6% molybdenum, up to about 12% tungsten, up to about 3% columbium, up to 5% tantalum, the total of the percentages of tungsten, molybdenum and tantalum being up to 12.5% and the maximum for the total of the percentage of chromium plus tantalum being 16%, about 4% to about 7% aluminum, about 0.5% to about 6% titanium, the total of the aluminum plus titanium being about 6.5% to about 10.5%, up to about 1.5% vanadium, up to about 0.3% zirconium, up to about 0.2% boron, and from in excess of 1% to about 5% hafnium with the balance being essentially nickel and nickel being present in at least about 36% by weight, said hafnium content being a selected amount within said range of in excess of 1% to about 5% to provide improved room temperature tensile elongation and said alloy having a hardenability factor of about 60 to about 72 and by virtue of the contained hafnium said alloy exhibiting in the cast, solidified state increased percent prior creep at 1400° F. and consistently exhibiting a predictable high minimum limit on values of percent prior creep at 1400° F. based on test samples cut from hardware, when compared with similarly constituted alloys devoid of hafnium.

40. A casting as in claim 39 wherein the molybdenum content of the alloy is a maximum of 6%, the boron content of the alloy is about .004% to about 0.1%, the tantalum content is up to about 4.5% and the carbon content is about 0.02% to about 0.18%.

41. A casting having a substantially non-symmetrical configuration, characterized by a substantial uniformity of basic metallographic structure across sections thereof and characterized by improved room temperature tensile elongation and by a relatively large proportionate volume of metal thermally conditioned to exhibit good mechanical characteristics at both high temperatures about 1800° F. and at intermediate temperatures about 1400° F. and made from a vacuum melted and vacuum-cast nickel-base alloy containing eutectic gamma-prime phase as-cast and consisting of in weight percent about 0.02% to about 0.5% carbon, about 7% to about 11% chromium, up to about 20% cobalt, up to about 6% molybdenum, up to about 12% tungsten, up to about 3% columbium, up to 5% tantalum, the total of the percentages of tungsten, molybdenum and tantalum being up to 12.5%, about 4% to about 7% aluminum, about 0.5% to about 6% titanium, the total of the aluminum plus titanium being about 6.5% to about 10.5%, up to about 1.5% vanadium, about 0.02% up to about 0.3% zirconium, up to about 0.1% boron and in excess of 1% to about 4% hafnium with the balance being essentially nickel together with small amounts of impurities and incidental elements which do not detrimentally affect the basic characteristics of the alloy, the nickel being present in at least about 36% by weight, said hafnium content being a selected amount within the range of in excess of 1% to about 4% to provide improved room temperature tensile elongation and said alloy having a hardenability factor of about 60 to about 72 and by virtue of said contained hafnium said alloy exhibiting in the cast, solidified state improved ductility at about 1300° F., to about 1600° F. and enhanced reliability for production of cast hardware having a predictable high minimum limit on values of percent prior creep at 1400° F. based on test samples cut from hardware, when compared with similarly constituted alloys devoid of hafnium.

42. A casting having a substantially non-symmetrical configuration, characterized by a substantial uniformity of basic metallographic structure across sections thereof and characterized by improved room temperature tensile elongation and by a relatively large proportionate volume of metal thermally conditioned to exhibit good mechanical characteristics at both high temperatures about 1800° F. and at intermediate temperatures about 1400° F. and made from a vacuum-cast nickel-base alloy consisting essentially, in weight percent, of about 0.10% to 0.18% carbon, about 7% to 11% chromium, about 6% to 13% cobalt, about 8% to 12% tungsten, up to about 3% molybdenum, up to about 3% tantalum, the maximum for the total of the percentages of tungsten, molybdenum and tantalum being 14%, about 1% to 2% titanium, about 5% to about 6% aluminum, the total percentage of aluminum plus titanium being at least about 6.5%, about 0.004% to 0.02% boron, up to about 0.2% zirconium and from in excess of 1% to 5% hafnium with the balance being essentially nickel, said hafnium content being a selected amount within the range of in excess of 1% to about 5% to provide improved room temperature tensile elongation and said alloy having a hardenability factor greater than about 60 and by virtue of the hafnium content said alloy exhibiting in the cast, solidified state improved ductilities at temperatures of about room temperature to about 1600° F. and enhanced reliability for casting of hardware having a predictable high minimum limit on values of percent prior creep at 1400° F. based on test samples cut from hardware, when compared with similarly constituted alloys devoid of hafnium.

43. A casting having a substantially non-symmetrical configuration, characterized by a substantial uniformity of of basic metallographic structure across sections thereof and characterized by improved room temperature tensile elongation and by a relatively large proportionate volume of metal thermally conditioned to exhibit good mechanical characteristics at both high temperatures about 1800° F. and at intermediate temperatures about 1400° F. and made from a vacuum-cast nickel-base alloy consisting essentially, in weight percent, of about 0.03% to 0.13% carbon, about 7% to 10% chromium, about 6% to 13% cobalt, up to about 2% tungsten, about 4% to 8% molybdenum, about 2.5% to 4.5% tantalum, the maximum for the total of the percentages of tungsten, molybdenum and tantalum being 14%, about 0.5% to 1.5% titanium, about 5.5% to 6.5% aluminum, the total percentage of aluminum plus titanium being at least about 6.5%, about 0.004% to 0.02% boron, up to about 0.3% zirconium and about 0.7% to 5% hafnium with the balance being essentially nickel, said hafnium content being a selected amount within the range of about 0.7% to about 5% to provide improved room temperture tensile elongation, said alloy having a hardenability factor of 60 to 72 and by virtue of the hafnium content said alloy exhibiting in the cast, solidified state improved ductilities at temperatures of about room temperature to about 1600° F. and enhanced reliability for casting of hardware having a predictable high minimum limit on values of percent prior creep at 1400° F. based on test samples cut from hardware, when compared with similarly constituted alloys devoid of hafnium.

44. A casting having a substantially non-symmetrical configuration, characterized by a substantial uniformity of basic metallographic structure across sections thereof and characterized by improved room temperature tensile elongation and by a relatively large proportionate volume of metal thermally conditioned to exhibit good mechanical characteristics at both high temperatures about 1800° F. and at intermediate temperatures about 1400° F. and made from a vacuum-cast nickel-base alloy consisting essentially, in weight percent, of about 0.02% to about 0.18% carbon, about 12% chromium, about 4.5% molybdenum, about 9.6% titanium, about 5.9% aluminium, about 0.004% to about 0.02% boron, up to about 0.3% zirconium, about 2.0% columbium, about 1% to about 4% hafnium, with the balance being essentially nickel, said hafnium content being a selected amount within the range of about 1% to about 4% to provide improved room temperature tensile elongation and by virtue of the hafnium content said alloy exhibiting in the cast, solidified state improved ductilities at temperatures of about room temperature to about 1600° F. and enhanced reliability for casting of hardware having a predictable high minimum limit on values of percent prior creep at 1400° F. based on test samples cut from hardware, when compared with similarly constituted alloys devoid of hafnium.

45. A casting having a substantially non-symmetrical configuration, characterized by a substantial uniformity of basic metallographic structure across sections thereof and characterized by improved room temperature tensile elongation and by a relatively large proportionate volume of metal thermally conditioned to exhibit good mechanical characteristics at both high temperatures about 1800° F. and at intermediate temperatures about 1400° F. and made from a vacuum-cast nickel-base alloy containing eutectic gamma-prime phase as-cast and consisting of in weight percent about 0.02% to about 0.2% carbon, about 7% to about 13% chromium, up to about 35% cobalt, up to about 8% molybdenum, up to about 14% tungsten, up to about 3% columbium, up to 4.5% tantalum, the maximum for the total of the percentages of tungsten, molybdenum and tantalum being 14%, about 4% to about 7% aluminum, about 0.5% to about 6% titanium, the total of the percentages of aluminum plus titanium being greater than 6%, up to about 1.5% vanadium, up to about 0.15% zirconium, about 0.002% to about 0.02% boron and from in excess of 1% to about 4% hafnium with the balance being essentially nickel and nickel being present in at least about 36% by weight, said hafnium content being a selected amount within the range of from in excess of 1% to about 4% to provide improved room temperature tensile elongation, said alloy having a hardenability factor of at least about 60, being adapted for use under stress at temperatures up to about 1900° F. and by virtue of the contained hafnium exhibiting in the cast, solidified state improved ductility at temperatures of about room temperature to about 1600° F. when compared to similarly constituted alloys devoid of hafnium.

46. Cast hardware for use under stress at high temperatures formed from a nickel-base alloy cast from molten state under vacuum into a mold having essentially the final configuration of the hardware, said alloy containing eutectic gamma-prime phase as-cast and consisting of in weight percent about 0.02% to about 0.2% carbon, about 7% to about 13% chromium, up to about 35% cobalt, up to about 8% molybdenum, up to about 2% tungsten, up to about 3% columbium, up to 5% tantalum, the maximum for the total of the percentages of tungsten, molybdenum and tantalum being up to 14%, about 4% to about 7% aluminum, about 0.5% to about 6% titanium, the total of the aluminum plus titanium being within the range about 6.5% to about 10.5%, up to about 1.5% vanadium, about 0.02% to about 0.3% zirconium, about 0.002% to about 0.2% boron and from about 0.7% to about 5% hafnium with the balance being essentially nickel and nickel being present in at least about 36% by weight, said hafnium content being a selected amount within said range of from about 0.7% to about 5% to provide improved room temperature tensile elongation, said alloy having a hardenability factor of at least 60, being adapted for use under stress at temperatures up to about 1900° F. and by virtue of the contained hafnium exhibiting in the cast, solidified state improved ductility at temperatures of about room temperature to about 1600° F. and enhanced reliability for production of cast hardware having a predictable high minimum limit on values of percent prior creep under stress at 1400° F. based on test samples cut from hardware, when compared to similarly constituted alloys devoid of hafnium.

being at least about 6.5%, about 0.004% to 0.02% boron, up to about 0.3% zirconium and about 0.7% to 5% hafnium with the balance being essentially nickel, said hafnium content being a selected amount within the range of about 0.7% to about 5% to provide improved room temperature tensile elongation, said alloy having a hardenability factor of about 60 to about 72, and said alloy by virtue of the contained hafnium exhibiting in the cast, solidified state improved ductility at temperatures of about room temperature to about 1600° F., increased percent prior creep under stress at 1400° F. and enhanced reliability for casting of hardware having a predictable high minimum limit on values of percent prior creep under stress at 1400° F. based on test samples cut from hardware, when compared to similarly constituted alloys devoid of hafnium.

37. Cast hardware made from nickel base alloy containing more than about 5% by weight of previously melted and cast alloy and consisting essentially, in weight percent, of about 0.02% to about 0.18% carbon, about 12% chromium, about 4.5% molybdenum, about 0.6% titanium, about 5.9% aluminum, about 0.004% to about 0.2% boron, up to about 0.3% zirconium, about 2.0% columbium, about 0.7% to about 4% hafnium, with the balance being essentially nickel, said hafnium content being a selected amount within the range of about 0.7% to about 5% to provide improved room temperature tensile elongation, and said alloy by virtue of the contained hafnium exhibiting in the cast, solidified state improved ductility at temperatures of about room temperature to about 1600° F., increased percent prior creep under stress at 1400° F. and enhanced reliability for casting of hardware having a predictable high minimum limit on values of percent prior creep under stress at 1400° F. based on test samples cut from hardware, when compared to similarly constituted alloys devoid of hafnium.

38. A casting having a substantially non-symmetrical configuration, characterized by a substantial uniformity of basic metallographic structure across sections thereof and characterized by improved room temperature tensile elongation, and said alloy by virtue of the contained hafmetal thermally conditioned to exhibit good mechanical characteristics at both high temperatures about 1800° F. and at intermediate temperatures about 1400° F. and made from a vacuum-cast nickel-base alloy containing eutectic gamma-prime phase as-cast and consisting of in weight percent about 0.02% to about 0.5% carbon, about 7% to about 13% chromium, up to about 35% cobalt, up to about 8% molybdenum, up to about 14% tungsten, up to about 3% columbium, up to 5.5% tantalum, the total of the percentages of tungsten, molybdenum and tantalum being up to 14%, about 4% to about 7% aluminum, about 0.5% to about 6% titanium, the total of the aluminum plus titanium being greater than about 6.5%, up to about 1.5% vanadium, up to about 0.2% boron, up to about 0.3% zirconium, and in excess of 1% to about 5% hafnium with the balance being essentially nickel together with up to small amounts of impurities and incidental elements which do not detrimentally affect the basic characteristics of the alloy, and nickel being present in at least about 36% by weight, said hafnium content being a selected amount within said range of in excess of 1% to about 5% to provide improved room temperature tensile elongation and said alloy having a hardenability factor greater than about 60, and by virtue of the contained hafnium said alloy exhibiting in the cast, solidified state improved ductility at temperatures of about room temperature to about 1600° F. and enhanced reliability for production of cast hardware having a predictable high minimum limit on values of percent prior creep under stress at 1400° F., when compared with similarly constituted alloys devoid of hafnium.

39. A casting having a substantially non-symmetrical configuration, characterized by a substantial uniformity of basic metallographic structure across sections thereof and characterized by improved room temperature tensile elongation and by a relatively large proportionate volume of metal thermally conditioned to exhibit good mechanical characteristics at both high temperatures about 1800° F. and at intermediate temperatures about 1400° F. and made from a vacuum melted and vacuum-cast nickel-base alloy containing eutectic gamma-prime phase as-cast and consisting of in weight percent about 0.02% to about 0.35% carbon, about 7% to about 13% chromium, up to about 20% cobalt, up to about 6% molybdenum, up to about 12% tungsten, up to about 3% columbium, up to 5% tantalum, the total of the percentages of tungsten, molybdenum and tantalum being up to 12.5% and the maximum for the total of the percentage of chromium plus tantalum being 16%, about 4% to about 7% aluminum, about 0.5% to about 6% titanium, the total of the aluminum plus titanium being about 6.5% to about 10.5%, up to about 1.5% vanadium, up to about 0.3% zirconium, up to about 0.2% boron, and from in excess of 1% to about 5% hafnium with the balance being essentially nickel and nickel being present in at least about 36% by weight, said hafnium content being a selected amount within said range of in excess of 1% to about 5% to provide improved room temperature tensile elongation and said alloy having a hardenability factor of about 60 to about 72 and by virtue of the contained hafnium said alloy exhibiting in the cast, solidified state increased percent prior creep at 1400° F. and consistently exhibiting a predictable high minimum limit on values of percent prior creep at 1400° F. based on test samples cut from hardware, when compared with similarly constituted alloys devoid of hafnium.

40. A casting as in claim 39 wherein the molybdenum content of the alloy is a maximum of 6%, the boron content of the alloy is about .004% to about 0.1%, the tantalum content is up to about 4.5% and the carbon content is about 0.02% to about 0.18%.

41. A casting having a substantially non-symmetrical configuration, characterized by a substantial uniformity of basic metallographic structure across sections thereof and characterized by improved room temperature tensile elongation and by a relatively large proportionate volume of metal thermally conditioned to exhibit good mechanical characteristics at both high temperatures about 1800° F. and at intermediate temperatures about 1400° F. and made from a vacuum melted and vacuum-cast nickel-base alloy containing eutectic gamma-prime phase as-cast and consisting of in weight percent about 0.02% to about 0.5% carbon, about 7% to about 11% chromium, up to about 20% cobalt, up to about 6% molybdenum, up to about 12% tungsten, up to about 3% columbium, up to 5% tantalum, the total of the percentages of tungsten, molybdenum and tantalum being up to 12.5%, about 4% to about 7% aluminum, about 0.5% to about 6% titanium, the total of the aluminum plus titanium being about 6.5% to about 10.5%, up to about 1.5% vanadium, about 0.02% up to about 0.3% zirconium, up to about 0.1% boron and in excess of 1% to about 4% hafnium with the balance being essentially nickel together with small amounts of impurities and incidental elements which do not detrimentally affect the basic characteristics of the alloy, the nickel being present in at least about 36% by weight, said hafnium content being a selected amount within the range of in excess of 1% to about 4% to provide improved room temperature tensile elongation and said alloy having a hardenability factor of about 60 to about 72 and by virtue of said contained hafnium said alloy exhibiting in the cast, solidified state improved ductility at about 1300° F., to about 1600° F. and enhanced reliability for production of cast hardware having a predictable high minimum limit on values of percent prior creep at 1400° F. based on test samples cut from hardware, when compared with similarly constituted alloys devoid of hafnium.

42. A casting having a substantially non-symmetrical configuration, characterized by a substantial unformity of basic metallographic structure across sections thereof and characterized by improved room temperature tensile elongation and by a relatively large proportionate volume of metal thermally conditioned to exhibit good mechanical characteristics at both high temperatures about 1800° F. and at intermediate temperatures about 1400° F. and made from a vacuum-cast nickel-base alloy consisting essentially, in weight percent, of about 0.10% to 0.18% carbon, about 7% to 11% chromium, about 6% to 13% cobalt, about 8% to 12% tungsten, up to about 3% molybdenum, up to about 3% tantalum, the maximum for the total of the percentages of tungsten, molybdenum and tantalum being 14%, about 1% to 2% titanium, about 5% to about 6% aluminum, the total percentage of aluminum plus titanium being at least about 6.5%, about 0.004% to 0.02% boron, up to about 0.2% zirconium and from in excess of 1% to 5% hafnium with the balance being essentially nickel, said hafnium content being a selected amount within the range of in excess of 1% to about 5% to provide improved room temperature tensile elongation and said alloy having a hardenability factor greater than about 60 and by virtue of the hafnium content said alloy exhibiting in the cast, solidified state improved ductilities at temperatures of about room temperature to about 1600° F. and enhanced reliability for casting of hardware having a predictable high minimum limit on values of percent prior creep at 1400° F. based on test samples cut from hardware, when compared with similarly constituted alloys devoid of hafnium.

43. A casting having a substantially non-symmetrical configuration, characterized by a substantial uniformity of of basic metallographic structure across sections thereof and characterized by improved room temperature tensile elongation and by a relatively large proportionate volume of metal thermally conditioned to exhibit good mechanical characteristics at both high temperatures about 1800° F. and at intermediate temperatures about 1400° F. and made from a vacuum-cast nickel-base alloy consisting essentially, in weight percent, of about 0.03% to 0.13% carbon, about 7% to 10% chromium, about 6% to 13% cobalt, up to about 2% tungsten, about 4% to 8% molybdenum, about 2.5% to 4.5% tantalum, the maximum for the total of the percentages of tungsten, molybdenum and tantalum being 14%, about 0.5% to 1.5% titanium, about 5.5% to 6.5% aluminum, the total percentage of aluminum plus titanium being at least about 6.5%, about 0.004% to 0.02% boron, up to about 0.3% zirconium and about 0.7% to 5% hafnium with the balance being essentially nickel, said hafnium content being a selected amount within the range of about 0.7% to about 5% to provide improved room temperture tensile elongation, said alloy having a hardenability factor of 60 to 72 and by virtue of the hafnium content said alloy exhibiting in the cast, solidified state improved ductilities at temperatures of about room temperature to about 1600° F. and enhanced reliability for casting of hardware having a predictable high minimum limit on values of percent prior creep at 1400° F. based on test samples cut from hardware, when compared with similarly constituted alloys devoid of hafnium.

44. A casting having a substantially non-symmetrical configuration, characterized by a substantial uniformity of basic metallographic structure across sections thereof and characterized by improved room temperature tensile elongation and by a relatively large proportionate volume of metal thermally conditioned to exhibit good mechanical characteristics at both high temperatures about 1800° F. and at intermediate temperatures about 1400° F. and made from a vacuum-cast nickel-base alloy consisting essentially, in weight percent, of about 0.02% to about 0.18% carbon, about 12% chromium, about 4.5% molybdenum, about 9.6% titanium, about 5.9% aluminium, about 0.004% to about 0.02% boron, up to about 0.3% zirconium, about 2.0% columbium, about 1% to about 4% hafnium, with the balance being essentially nickel, said hafnium content being a selected amount within the range of about 1% to about 4% to provide improved room temperature tensile elongation and by virtue of the hafnium content said alloy exhibiting in the cast, solidified state improved ductilities at temperatures of about room temperature to about 1600° F. and enhanced reliability for casting of hardware having a predictable high minimum limit on values of percent prior creep at 1400° F. based on test samples cut from hardware, when compared with similarly constituted alloys devoid of hafnium.

45. A casting having a substantially non-symmetrical configuration, characterized by a substantial uniformity of basic metallographic structure across sections thereof and characterized by improved room temperature tensile elongation and by a relatively large proportionate volume of metal thermally conditioned to exhibit good mechanical characteristics at both high temperatures about 1800° F. and at intermediate temperatures about 1400° F. and made from a vacuum-cast nickel-base alloy containing eutectic gamma-prime phase as-cast and consisting of in weight percent about 0.02% to about 0.2% carbon, about 7% to about 13% chromium, up to about 35% cobalt, up to about 8% molybdenum, up to about 14% tungsten, up to about 3% columbium, up to 4.5% tantalum, the maximum for the total of the percentages of tungsten, molybdenum and tantalum being 14%, about 4% to about 7% aluminum, about 0.5% to about 6% titanium, the total of the percentages of aluminum plus titanium being greater than 6%, up to about 1.5% vanadium, up to about 0.15% zirconium, about 0.002% to about 0.02% boron and from in excess of 1% to about 4% hafnium with the balance being essentially nickel and nickel being present in at least about 36% by weight, said hafnium content being a selected amount within the range of from in excess of 1% to about 4% to provide improved room temperature tensile elongation, said alloy having a hardenability factor of at least about 60, being adapted for use under stress at temperatures up to about 1900° F. and by virtue of the contained hafnium exhibiting in the cast, solidified state improved ductility at temperatures of about room temperature to about 1600° F. when compared to similarly constituted alloys devoid of hafnium.

46. Cast hardware for use under stress at high temperatures formed from a nickel-base alloy cast from molten state under vacuum into a mold having essentially the final configuration of the hardware, said alloy containing eutectic gamma-prime phase as-cast and consisting of in weight percent about 0.02% to about 0.2% carbon, about 7% to about 13% chromium, up to about 35% cobalt, up to about 8% molybdenum, up to about 2% tungsten, up to about 3% columbium, up to 5% tantalum, the maximum for the total of the percentages of tungsten, molybdenum and tantalum being up to 14%, about 4% to about 7% aluminum, about 0.5% to about 6% titanium, the total of the aluminum plus titanium being within the range about 6.5% to about 10.5%, up to about 1.5% vanadium, about 0.02% to about 0.3% zirconium, about 0.002% to about 0.2% boron and from about 0.7% to about 5% hafnium with the balance being essentially nickel and nickel being present in at least about 36% by weight, said hafnium content being a selected amount within said range of from about 0.7% to about 5% to provide improved room temperature tensile elongation, said alloy having a hardenability factor of at least 60, being adapted for use under stress at temperatures up to about 1900° F. and by virtue of the contained hafnium exhibiting in the cast, solidified state improved ductility at temperatures of about room temperature to about 1600° F. and enhanced reliability for production of cast hardware having a predictable high minimum limit on values of percent prior creep under stress at 1400° F. based on test samples cut from hardware, when compared to similarly constituted alloys devoid of hafnium.

47. A nickel-base alloy specifically adapted for casting into the form of cast hardware for use under stress at high temperatures which alloy contains more than about 5% by weight of previously melted and cast alloy and eutectic gamma-prime phase as-cast and consists of in weight percent about 0.02% to 0.35% carbon, about 7% to about 13% chromium, up to about 35% cobalt, up to about 2% tungsten, up to about 8% molybdenum, up to about 3% columbium, up to 5% tantalum, the maximum for the total of the percentages of tungsten, molybdenum and tantalum being 14% and the maximum for the total of the percentages of tantalum plus chromium being 16%, about 4% to about 7% aluminum, about 0.5% to about 6% titanium, the total of the aluminum plus titanium being 6.5% to 10.5%, up to about 1.5% vanadium, up to about 0.2% zirconium, about 0.002 to about 0.2% boron and about 0.7% to about 5% hafnium, with the balance being essentially nickel together with small amounts of impurities and incidental elements which do not detrimentally affect the basic characteristics of the alloy, and nickel being present in at least about 36% by weight, said hafnium content being a selected amount within the range of about 0.7% to about 5% to provide improved room tensile elongation, said alloy having a hardenability factor of about 60 to about 72, being adapted for use under stress at temperatures in excess of 1650° F., and by virtue of the contained hafnium, and said alloy exhibiting in the cast solidified state improved ductility at temperatures of about room temperatures to about 1600° F., and increased percent prior creep at 1400° F. and enhanced reliability for production of cast hardware having a predictable high minimum limit on values of percent prior creep at 1400° F., when compared to similarly constituted alloys devoid of hafnium.

48. Cast hardware for use under stress at high temperatures made from a nickel-base alloy cast from molten state into a mold having essentially the final configuration of said hardware, said alloy containing more than about 5% by weight of previously melted and cast alloy and consisting essentially, in percent by weight, of about 0.02% to about 0.5% carbon, about 7% to 13% chromium, up to about 35% cobalt, up to about 2% tungsten, up to about 8% molybdenum less than about 5% tantalum, the total of the percentages of tantalum, tungsten and molybdenum being 14%, about 0.5% to about 6% titanium, about 4% to about 7% aluminum, the total aluminum plus titanium being at least about 6.5%, about 0.002 to about 0.2% boron, up to about 0.3% zirconium, up to about 3% columbium, up to about 1.5% vanadium, about 0.7% to about 5% by weight of hafnium with the balance being essentially nickel, together with small amounts of impurities and incidental elements which do not detrimentally affect the basic characteristics of the alloy, the nickel being present in at least about 36% by weight, said hafnium content being a selected amount within the range of 0.7% to about 5% to provide improved room temperature tensile elongation, said alloy having a hardenability factor of about 60 to about 72, said alloy being characterized in the solidified as-cast condition by containing gamma-prime phase and by being especially adapted to be used in the cast condition under load at temperatures in excess of about 1650° F., said alloy by virtue of the hafnium content exhibiting in the cast-solidified state improved ductility at temperatures of about room temperature to about 1600° F. and increased percent prior creep under stress at 1400° F. based on test samples cut from hardware when compared with similarly constituted alloy devoid of hafnium.

49. Cast gas turbine engine hardware made from a nickel-base alloy containing eutectic gamma-prime phase as-cast and consisting of in weight percent about 0.02% to about 0.2% carbon, about 7% to about 13% chromium, up to about 35% cobalt, up to about 8% molybdenum, up to about 2% tungsten, up to 4.5% tantalum, the total of the percentages of tungsten, molybdenum and tantalum being up to 14%, about 4% to about 7% aluminum, about 0.5% to about 6% titanium, the total of the aluminum plus titanium being greater than 6%, up to about 3% columbium, up to about 1.5% vanadium, up to about 0.2% zirconium, about 0.002% to about 0.2% boron and about 1% to about 5% hafnium with the balance being essentially nickel together with small amounts of impurities and incidental elements which do not detrimentally affect the basic characteristics of the alloy, the nickel being present in at least about 36% by weight, said hafnium content being a selected amount within the range of about 1% to about 5% to provide improved room temperature tensile elongation, said alloy having a hardenability factor of at least about 60, said alloy being characterized in the solidified as-cast condition by containing gamma-prime phase and by being especially adapted to be used in cast condition under load at temperatures up to about 1900° F. and by virtue of said hafnium content exhibiting in the cast, solidfied state improved ductility at temperatures of about room temperature to about 1600° F. and exhibiting increased percent prior creep under stress at 1400° F., when compared to similarly constituted alloys devoid of hafnium.

References Cited
UNITED STATES PATENTS

| | | | |
|---|---|---|---|
| 3,526,499 | 9/1970 | Quigg et al. | 75—171 |
| 3,479,157 | 11/1969 | Richards et al. | 75—171 |
| 3,615,377 | 10/1971 | Quigg et al. | 75—171 |

FOREIGN PATENTS 943,141  11/1963  Great Britain.

OTHER REFERENCES

Rizzo et al.: Research directed toward the development of a wrought superalloy, technical report AFML-TR-66-364-November 1966, Air Force Materials Laboratory, Research and Technology Division, Air Force Systems Command, Wright-Patterson Air Force Base, Ohio.

Chemical Abstracts, 1968, vol. 68, No. 5753m, p. 572.

Chemical Abstracts, 1968, vol. 68, No. 81758g, p. 7891.

Collins, H. E.: Development of High Temperature Nickel-Base Alloys for Jet Engine Turbine Bucket Applications, 1967, Summary Report NASA CR-54507, TRW-ER-7162, Clearing House for Federal Scientific and Technical Information N67-35348.

RICHARD O. DEAN, Primary Examiner

U.S. Cl. X.R.

148—32.5

UNITED STATES PATENT OFFICE
CERTIFICATE OF CORRECTION

Patent No. 3,677,747  Dated July 18, 1972

Inventor(s) Carl H. Lund, et al

It is certified that error appears in the above-identified patent and that said Letters Patent are hereby corrected as shown below:

Column 2, line 35 - "speciments" should be -- specimens --.

Column 3, line 17 - "or" should be -- on --.

Column 5, line 26 - "aluminum titanium" should be -- aluminum plus titanium --. Line 46 - "composits" should be -- composites --.

Column 6, line 75 - "at least 60" should be -- at least about 60 --.

Column 7, lines 4 and 5 - "lift-to-rupture" should be --life-to-rupture --; line 8 - before "k.s.i." omit the beginning of a parenthesis "("; Line 28 in vertical column C of Table II in the horizontal line for Zr "0.50" should be --0.05 --.

Column 9, lines 38-41, in 1st vertical column of Table V, "Example No." should be in heading above "Alloy B" and not below.

Column 9, lines 52-55, in 1st vertical column of Table VI, "Example No." should be in heading above "Alloy B" and not below.

Column 11, lines 70-73, in 1st vertical column of Table VIII, "Example No." should be in heading above "Alloy B" and not below.

Column 12, lines 8-11, in 1st vertical column of Table IX, "Example No." should be in heading above "Alloy B" and not below.

Page 1

UNITED STATES PATENT OFFICE
CERTIFICATE OF CORRECTION

Patent No. 3,677,747                    Dated   July 18, 1972

Inventor(s)   Carl H. Lund, et al

It is certified that error appears in the above-identified patent and that said Letters Patent are hereby corrected as shown below:

Column 12, in 1st vertical column of Table X, "Example No." should be in heading "Alloy B" and not below.

Column 13, lines 4-6, in 1st vertical column of Table XI, "Example No." should be in heading above "Alloy A" and not below.

Column 13, line 22 - "hufnium-free" should be --hafnium-free --.

Column 13, lines 34-36 in last vertical column heading of Table XII, "After hours at 2,000° F." should be --After 50 hours at 2,000° F. --.

Column 16, line 14 Table XIV, column headed "Hours", third line "95.7" should be -- 94.7 --; lines 18-38 in vertical column of Table XIV headed "Wt. percent Hf", brackets following indicated Hf percentages should encompass in each case four lines of the data presented under vertical columns under heading "1400° F/94,000 p.s.i., throughout the table.

Column 16, Table XIV, last two columns which are headed "Hours" and "Percent prior creep" - (each group should have 4) starting with the eighth line (the last part of "Heat No. 2") was incorrectly placed one unit down which makes all the rest off.

Column 20, line 60, - in footnote (2) - "Balance" should be --Bal. E --.

Page 2

UNITED STATES PATENT OFFICE
CERTIFICATE OF CORRECTION

Patent No. 3,677,747　　　　　　　　　　Dated July 18, 1972

Inventor(s)　Carl H. Lund, et al

It is certified that error appears in the above-identified patent and that said Letters Patent are hereby corrected as shown below:

Column 21, line 33 - "ot" should be --to --.

Column 22, line 49 - "price" should be -- prime--; line 57 - "5.0%" should be -- 0.5% --.

Column 24, line 59 - after "carbon," the word "and" should be deleted.

Column 25, line 18 - before "about" the word "of" should be deleted; line 61 - "0.2%" should be --0.02 %--.

Column 26, line 3 - "similiarly" should be --similarly --; same line, "constructed" should be -- constituted --.

Column 27,　　　　　　　　　　　　　　　　　; line 74 - "perecnt" should be -- percent --.

Column 29, line 2 - "nckel" should be -- nickel --.

Column 33, line 41 - "gation, and said alloy by virtue of the contained haf-" should be -- gation and by a relatively large proportionate volume of --.

Column 34, line 70 - after "1300° F." delete the comma (,).

Page 3

UNITED STATES PATENT OFFICE
CERTIFICATE OF CORRECTION

Patent No. 3,677,747            Dated July 18, 1972

Inventor(s) Carl H. Lund, et al

It is certified that error appears in the above-identified patent and that said Letters Patent are hereby corrected as shown below:

Column 35, line 53 - "temperture" should be -- temperature --.

Column 37, line 29 - "temperatures", second occurrence, should read -- temperature --.

Column 37, line 43 - after "molybdenum" insert a comma (,).

Signed and sealed this 6th day of March 1973.

(SEAL)
Attest:

EDWARD M. FLETCHER, JR.
Attesting Officer

ROBERT GOTTSCHALK
Commissioner of Patents